US008391626B2

(12) United States Patent
Takahashi et al.

(10) Patent No.: US 8,391,626 B2
(45) Date of Patent: Mar. 5, 2013

(54) LEARNING OF COEFFICIENTS FOR MOTION DEBLURRING BY PIXEL CLASSIFICATION AND CONSTRAINT CONDITION WEIGHT COMPUTATION

(75) Inventors: Noriaki Takahashi, Tokyo (JP); Hisakazu Shiraki, Kanagawa (JP); Takahiro Nagano, Kanagawa (JP); Yasuhiro Suto, Tokyo (JP); Kenji Takahashi, Kanagawa (JP); Tsutomu Watanabe, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 12/331,930

(22) Filed: Dec. 10, 2008

(65) Prior Publication Data

US 2009/0161948 A1 Jun. 25, 2009

(30) Foreign Application Priority Data

Dec. 20, 2007 (JP) .................................. 2007-328312

(51) Int. Cl.
*G06K 9/40* (2006.01)
*G06K 9/62* (2006.01)
(52) U.S. Cl. ...................... 382/255; 345/618; 348/208.4; 382/159; 382/224
(58) Field of Classification Search ......................... None
See application file for complete search history.

(56) References Cited

U.S. PATENT DOCUMENTS

| 6,442,203 | B1 * | 8/2002 | Demos ..................... 375/240.16 |
| 8,169,510 | B2 * | 5/2012 | Kondo ........................... 348/241 |
| 2005/0111749 | A1 * | 5/2005 | Kondo ........................... 382/261 |
| 2006/0140497 | A1 * | 6/2006 | Kondo et al. ................. 382/254 |
| 2007/0116372 | A1 * | 5/2007 | Kondo et al. ................. 382/254 |
| 2007/0126882 | A1 * | 6/2007 | Kondo et al. .............. 348/208.4 |
| 2007/0268372 | A1 * | 11/2007 | Kondo et al. .............. 348/208.4 |
| 2008/0008356 | A1 * | 1/2008 | Nagano et al. ................ 382/107 |
| 2009/0161976 | A1 * | 6/2009 | Shiraki et al. ................ 382/255 |
| 2009/0161977 | A1 * | 6/2009 | Shiraki et al. ................ 382/255 |
| 2009/0262234 | A1 * | 10/2009 | Kondo et al. ................. 348/342 |
| 2010/0001989 | A1 * | 1/2010 | Okumura et al. ............. 345/214 |
| 2010/0054336 | A1 * | 3/2010 | Okumura et al. ........ 375/240.16 |
| 2010/0061642 | A1 * | 3/2010 | Kondo et al. ................. 382/224 |

FOREIGN PATENT DOCUMENTS

JP 2005-18534 1/2005

OTHER PUBLICATIONS

Shan et al. (Aug. 2008) "High quality motion deblurring from a single image." ACM Trans. on Graphics, vol. 27 No. 3, Article 73.*

* cited by examiner

*Primary Examiner* — Barry Drennan
(74) *Attorney, Agent, or Firm* — Oblon, Spivak, McClelland, Maier & Neustadt, L.L.P.

(57) ABSTRACT

A coefficient learning apparatus includes: a student-image generation section configured to generate a student image from the teacher image; a class classification section configured to sequentially set each of pixels in the teacher image as a pixel of interest and generate a class for the pixel of interest from the values of a plurality of specific pixels; a weight computation section configured to add up feature quantities; and a processing-coefficient generation section configured to generate a prediction coefficient on the basis of a determinant including said deterioration equation and a weighted constraint condition equation.

7 Claims, 14 Drawing Sheets

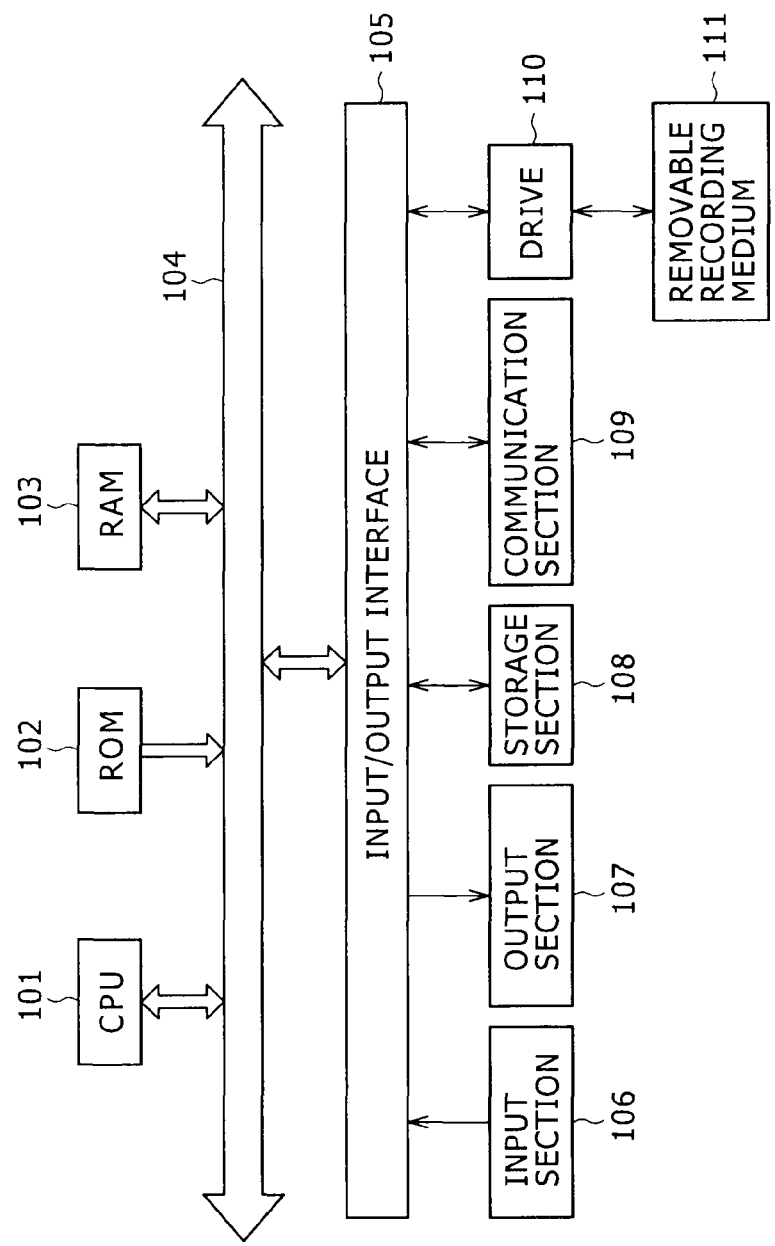

LEARNING OF COEFFICIENTS FOR MOTION DEBLURRING BY PIXEL CLASSIFICATION AND CONSTRAINT CONDITION WEIGHT COMPUTATION

CROSS REFERENCES TO RELATED APPLICATIONS

The present invention contains subject matter related to Japanese Patent Application JP 2007-328312 filed in the Japan Patent Office on Dec. 20, 2007, the entire contents of which being incorporated herein by reference.

BACKGROUND OF THE INVENTION

1. Field of the Invention

The present invention relates to a coefficient learning apparatus, a coefficient learning method, an image processing apparatus, an image processing method and an image processing program. In particular, the present invention relates to a coefficient learning apparatus, a coefficient learning method, an image processing apparatus, an image processing method and an image processing program, capable of generating processing coefficients usable in a process of eliminating blurring appearances of an image with a higher degree of precision than the precision of the technology in related art.

2. Description of the Related Art

In a process disclosed in a document such as Japanese Patent Laid-open No. 2005-018534 (hereinafter referred to as Patent Document 1) as a process in related art of eliminating blurring appearances of an image, processes are carried out at the steps Sa to Sc as follows.

The step Sa is a step of carrying out a process of establishing a mixture condition equation such as a condition equation for a movement blurring appearance or an out-of-focus appearance.

The step Sb is a step of carrying out a process of establishing a constraint condition such as a condition for minimizing the sum of absolute values of differences in values among adjacent pixels in an image.

The step Sc is a step of carrying out a process of finding pixel values satisfying the conditions established at the steps Sa and Sb.

SUMMARY OF THE INVENTION

In accordance with an embodiment of the present invention, there is provided a coefficient learning apparatus employing: a student-image generation section configured to generate a student image, which has a quality degraded from the quality of a teacher image in accordance with a plurality of deterioration model equations each corresponding to one of the plurality of deterioration types, from the teacher image; a class classification section configured to sequentially set each of pixels in the teacher image as a pixel of interest and generate a class for the pixel of interest from the values of pixels in the student image located at positions corresponding to the position of the pixel of interest and peripheral positions surrounding the position of the pixel of interest; a weight computation section configured to compute a weight of a constraint condition equation for at least some pixels in said teacher image based on the sum of feature quantities for said each class, said feature quantity representing a relation between said pixels and adjacent pixels in said teacher image under said deterioration model equation used for finding the values of pixels in said student image from the values of pixels located at positions corresponding to the position of said pixel of interest and peripheral positions surrounding said position of said pixel of interest; and a processing-coefficient generation section configured to carry out a prediction-coefficient generation process of generating a prediction coefficient to predict the value of said pixel of interest in said teacher image by carrying out a computation process applying to said plurality of pixels in student image for said each deterioration type and each class on the basis of a determinant including said deterioration equation and a weighted constraint condition equation. The processing-coefficient generation section stores the prediction coefficient in a processing-coefficient storage section 12 shared by the coefficient learning apparatus 11 included in the information processing system shown in the block diagram of FIG. 3 and an image processing apparatus 13 included in the information processing system shown in the block diagram of FIG. 9.

The weight computation section assigns the smaller weight value of said constraint condition equation in case of the larger sum of feature quantities.

The student-image generation section generates a student image by adding blurring appearances to the teacher image.

The student-image generation section generates a student image by reducing the teacher image.

A coefficient learning method provided in accordance with an embodiment of the present invention is a coefficient learning method adopted by the coefficient learning apparatus described above whereas a coefficient learning program provided in accordance with an embodiment of the present invention is a coefficient learning program implementing the coefficient learning method.

In the coefficient learning apparatus, the coefficient learning method and the coefficient learning program which are provided in accordance with an embodiment of the present invention: a student image, which has a quality degraded from the quality of a teacher image in accordance with a plurality of deterioration model equations each corresponding to one of the plurality of deterioration types, is generated from the teacher image; each of pixels in the teacher image is sequentially set as a pixel of interest and a class is generated for the pixel of interest from the values of a plurality of specific pixels in the student image located at positions corresponding to the position of the pixel of interest in the teacher image and peripheral positions surrounding the position of the pixel of interest; a weight of a constraint condition equation for at least some pixels in said teacher image is computed based on the sum of feature quantities for said each class, said feature quantity representing a relation between said pixels and adjacent pixels in said teacher image under said deterioration model equation used for finding the values of pixels in said student image from the values of pixels located at positions corresponding to the position of said pixel of interest and peripheral positions surrounding said position of said pixel of interest; and a prediction coefficient is found as a coefficient to be used in image processing carried out by an image processing apparatus to predict the value of said pixel of interest in said teacher image by carrying out a computation process applying to said plurality of pixels in student image for said each deterioration type and each class on the basis of a determinant including said deterioration equation and a weighted constraint condition equation.

In accordance with another embodiment of the present invention, there is provided an image processing apparatus for generating an output image, which has a quality higher than the quality of an input image, from the input image. The image processing apparatus employs: a class-pixel extraction section configured to extract a plurality of pixels in the input image as student pixels located at positions corresponding to the position of a pixel of interest in the output image and peripheral positions surrounding the position of the pixel of interest; a class setting section configured to set a class in accordance with the values of the pixels extracted by the class-pixel extraction section; a prediction-pixel extraction section configured to extract a plurality of pixels in the input image as student pixels located at positions corresponding to the position of the pixel of interest in the output image and the peripheral positions surrounding the position of the pixel of interest; a deterioration-type setting section configured to set a deterioration type; and a prediction processing section configured to predict the value of the pixel of interest by carrying out a computation process on the values (denoted by notation x) of the pixels extracted by the prediction-pixel extraction section and a prediction coefficient which is selected on the basis of the class and the deterioration type. The prediction coefficient cited above is a coefficient generated in advance in a coefficient learning process carried out by: generating a student image, which has a quality degraded from the quality of a teacher image in accordance with a plurality of deterioration model equations each corresponding to one of the plurality of deterioration types, from the teacher image; sequentially setting each of pixels in the teacher image as a pixel of interest and generating a class for the pixel of interest from the values of pixels in the student image located at positions corresponding to the position of the pixel of interest in the teacher image and peripheral positions surrounding the position of the pixel of interest; computing a weight of a constraint condition equation for at least some pixels in said teacher image based on the sum of feature quantities for said each class, said feature quantity representing a relation between said pixels and adjacent pixels in said teacher image under said deterioration model equation used for finding the values of pixels in said student image from the values of pixels located at positions corresponding to the position of said pixel of interest and peripheral positions surrounding said position of said pixel of interest; constructing a matrix composed of matrix elements based on a horizontal movement quantity used for generating the student image and based on the weight; and generating a prediction coefficient by carrying out a computation process for each deterioration type and each class on the basis of a determinant including said deterioration equation and a weighted constraint condition equation.

In the coefficient learning process of generating the prediction coefficient, the weight assigns the smaller weight value of said constraint condition equation in case of the larger sum of feature quantities.

In the coefficient learning process of generating the prediction coefficient, the student image is generated by adding blurring appearances to the teacher image.

In the coefficient learning process of generating the prediction coefficient, the student image is generated by reducing the teacher image.

An image processing method provided in accordance with the other embodiment of the present invention is an image processing method adopted by the image processing apparatus described above whereas an image processing program provided in accordance with the embodiment of the present invention is an image processing program implementing the image processing method.

In the image processing apparatus, the image processing method and the image processing program which are provided in accordance with the other embodiment of the present invention, an output image having a quality higher than the quality of an input image is generated by: extracting a plurality of pixels in the input image located at positions corresponding to the position of a pixel of interest in the output image and peripheral positions surrounding the position of the pixel of interest and setting a class in accordance with the values of the extracted pixels; extracting a plurality of specific pixels in the input image located at positions corresponding to the position of the pixel of interest in the output image and peripheral positions surrounding the position of the pixel of interest; setting a deterioration type; and predicting the value of the pixel of interest by carrying out a computation process on the values of the specific pixels a prediction coefficient which is selected on the basis of the class and a deterioration type to be described below. The prediction coefficient is a coefficient generated in advance in a coefficient learning process carried out by: generating a student image, which has a quality degraded from the quality of a teacher image in accordance with a plurality of deterioration model equations each corresponding to one of the plurality of deterioration types cited above, from the teacher image; sequentially setting each of pixels in the teacher image as a pixel of interest and generating a class for the pixel of interest from the values of pixels in the student image located at positions corresponding to the position of the pixel of interest in the teacher image and peripheral positions surrounding the position of the pixel of interest; computing a weight of a constraint condition equation for at least some pixels in said teacher image based on the sum of feature quantities for said each class, said feature quantity representing a relation between said pixels and adjacent pixels in said teacher image under said deterioration model equation used for finding the values of pixels in said student image from the values of pixels located at positions corresponding to the position of said pixel of interest and peripheral positions surrounding said position of said pixel of interest; and generating a prediction coefficient to be used for predicting the value of the pixel of interest in the teacher image by carrying out a computation process on the values of the specific pixels in the student image for each of the deterioration types each corresponding to one of the deterioration model equations and each aforementioned class on the basis of a determinant including said deterioration equation and a weighted constraint condition equation.

As described above, in accordance with the present invention, it is possible to implement a process to remove blurring appearances from an image with a high degree of precision.

BRIEF DESCRIPTION OF THE DRAWINGS

FIG. 15 is a block diagram showing a typical configuration of a personal computer serving as an information processing system to which an embodiment of the present invention is applied.

DETAILED DESCRIPTION OF THE PREFERRED EMBODIMENTS

Preferred embodiments of the present invention are explained by referring to diagrams as follows.

The description begins with explanation of an embodiment of a present invention applied to a process to remove blurring appearances from an image. As will be described later, the present invention can be applied to an entire process to restore a deteriorating image to its original image (or predict the original image of the deteriorating image). It is to be noted, however, that in order to make the explanation simple, the following description merely explains a process to remove blurring appearances from an image as a typical example of the process to restore a deteriorating image to its original image.

In addition, in order to simplify the explanation, the following description explains a typical movement-blurring process for a processing area width l of 10 pixels (that is, l=10) and a horizontal movement quantity v of 4 pixels (that is, v=4). It is to be noted that a movement distance which is expressed in terms of pixels is a distance by which a subject of photographing moves during the shutter time.

In the blurring removal process to which an embodiment of the present invention is applied, in place of the processes carried out at steps Sa to Sc explained earlier in the paragraph with a title of "BACKGROUND OF THE INVENTION," processes carried out at steps SA to SC explained below are adopted.

The step SA is a step at which a process is carried out to establish mixture condition equations.

Figure 1:
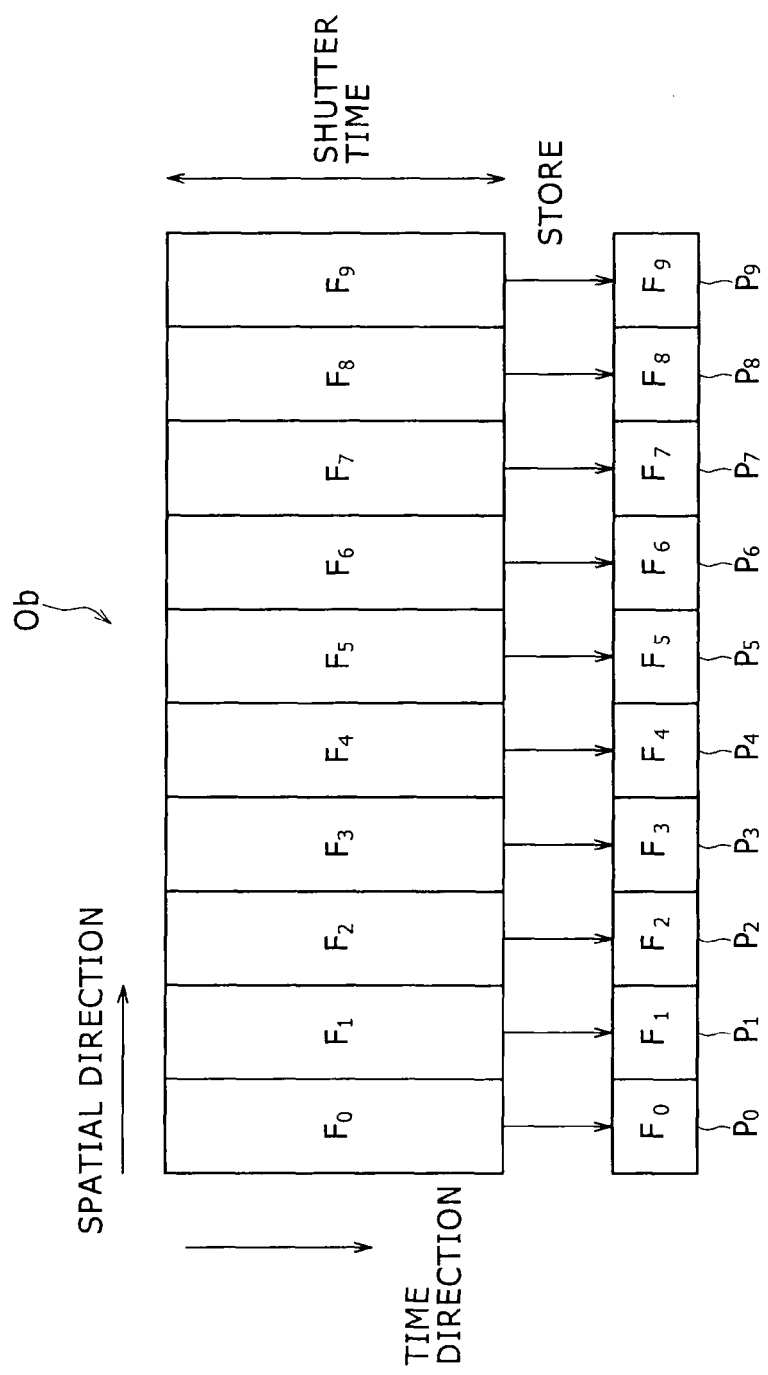
FIG. 1 is a diagram showing typical values of pixels for a standstill object of photographing.

To put it concretely, for example, let a photographing object Ob of a camera be in a standstill state as shown in FIG. 1. In this case, for pixels $P_0$ to $P_9$ each serving as a photographing element of the camera, let original pixel values $F_0$ to $F_9$ respectively be observed within a shutter time.

Figure 2:
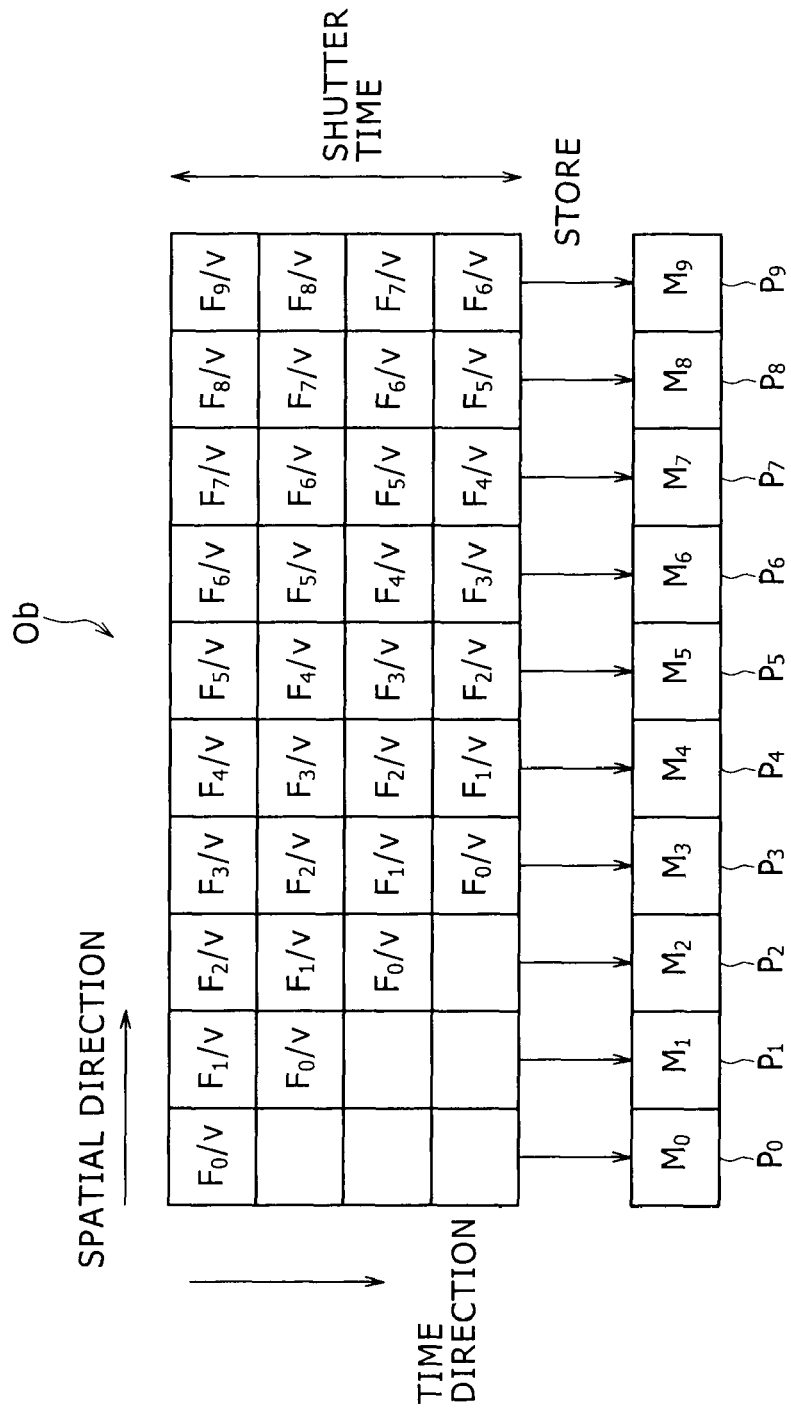
FIG. 2 is a diagram showing typical values of pixels for a moving object of photographing.

Let us assume, for example, that the photographing object Ob moves by a horizontal movement quantity v of 4 pixels (that is, v=4) within a shutter time as shown in FIG. 2. For pixels $P_0$ to $P_9$ respectively, let pixel values $M_0$ to $M_9$ be observed within the shutter time. In this case, the pixel values $M_3$ to $M_9$ can be expressed by Equation (1) given below in terms of the original pixels values $F_0$ to $F_9$ and the horizontal movement quantity v. That is to say, in this embodiment, Equation (1) is established at the step SA.

$$M_3 = (F_0 + F_1 + F_2 + F_3)/v \tag{1}$$

$$M_4 = (F_1 + F_2 + F_3 + F_4)/v$$

$$M_5 = (F_2 + F_3 + F_4 + F_5)/v$$

$$\vdots$$

$$M_9 = (F_6 + F_7 + F_8 + F_9)/v$$

The step SB is a step at which a process is carried out to establish constraint condition equations.

The number of variables in the mixture condition equations established at the step SA may be greater than the number of mixture condition equations. Thus, in order to solve the mixture condition equations for the variables, it is necessary to introduce constraint condition equations. The step SB is the step of carrying out the process to establish the constraint condition equations which are represented by Equation (2) given below.

In each of the constraint condition equations of this embodiment, the difference in value between 2 pixels adjacent to each other is set at 0 as follow.

$$F_0 - F_1 = 0 \tag{2}$$

$$F_1 - F_2 = 0$$

$$F_2 - F_3 = 0$$

$$\vdots$$

$$F_8 - F_9 = 0$$

It is to be noted that the constraint condition equations are by no means limited to equations representing that differences in value among adjacent pixels are 0. That is to say, for example, the constraint condition equations can be equations representing that adjacent pixels have smoothly changing values. Equation (3) given below expresses typical equations representing that adjacent pixels have smoothly changing values.

$$-F_{i-1} + 2F_i - F_{i+1} = 0 \tag{3}$$

The step SC is a step at which a process is carried out to infer pixel values as follows.

Equation (4) is obtained by combining error terms and constraint condition equations of Equation (1) and Equation (2) with the weights $W_0$ to $W_8$.

$$\begin{bmatrix} 1/v & 1/v & 1/v & 1/v & 0 & 0 & 0 & 0 & 0 & 0 \\ 0 & 1/v & 1/v & 1/v & 1/v & 0 & 0 & 0 & 0 & 0 \\ 0 & 0 & 1/v & 1/v & 1/v & 1/v & 0 & 0 & 0 & 0 \\ 0 & 0 & 0 & 1/v & 1/v & 1/v & 1/v & 0 & 0 & 0 \\ 0 & 0 & 0 & 0 & 1/v & 1/v & 1/v & 1/v & 0 & 0 \\ 0 & 0 & 0 & 0 & 0 & 1/v & 1/v & 1/v & 1/v & 0 \\ 0 & 0 & 0 & 0 & 0 & 0 & 1/v & 1/v & 1/v & 1/v \\ W_0 & -W_0 & 0 & 0 & 0 & 0 & 0 & 0 & 0 & 0 \\ 0 & W_1 & -W_1 & 0 & 0 & 0 & 0 & 0 & 0 & 0 \\ 0 & 0 & W_2 & -W_2 & 0 & 0 & 0 & 0 & 0 & 0 \\ 0 & 0 & 0 & W_3 & -W_3 & 0 & 0 & 0 & 0 & 0 \\ 0 & 0 & 0 & 0 & W_4 & -W_4 & 0 & 0 & 0 & 0 \\ 0 & 0 & 0 & 0 & 0 & W_5 & -W_5 & 0 & 0 & 0 \\ 0 & 0 & 0 & 0 & 0 & 0 & W_6 & -W_6 & 0 & 0 \\ 0 & 0 & 0 & 0 & 0 & 0 & 0 & W_7 & -W_7 & 0 \\ 0 & 0 & 0 & 0 & 0 & 0 & 0 & 0 & W_8 & -W_8 \end{bmatrix} \quad (4)$$

$$\begin{bmatrix} F_0 \\ F_1 \\ F_2 \\ F_3 \\ F_4 \\ F_5 \\ F_6 \\ F_7 \\ F_8 \\ F_9 \end{bmatrix} = \begin{bmatrix} M_3 \\ M_4 \\ M_5 \\ M_6 \\ M_7 \\ M_8 \\ M_9 \\ 0 \\ 0 \\ 0 \\ 0 \\ 0 \\ 0 \\ 0 \\ 0 \\ 0 \end{bmatrix} + \begin{bmatrix} e_{m3} \\ e_{m4} \\ e_{m5} \\ e_{m6} \\ e_{m7} \\ e_{m8} \\ e_{m9} \\ W_0 e_{b0} \\ W_1 e_{b1} \\ W_2 e_{b2} \\ W_3 e_{b3} \\ W_4 e_{b4} \\ W_5 e_{b5} \\ W_6 e_{b6} \\ W_7 e_{b7} \\ W_8 e_{b8} \end{bmatrix}$$

In this case, let a left matrix on the left-hand side of the equation be denoted by notation A, a right matrix (or a column vector) on the left-hand side of the equation be denoted by notation y, a matrix (or a column vector) serving as the first term (the term on the left-hand side of an operator+) on the right-hand side of the equation be denoted by notation x and a matrix (or a column vector) serving as the second term (the term on the right-hand side of the operator+) on the right-hand side of the equation be denoted by notation e. In this case, Equation (4) can be rewritten into Equation (5) as follows.

$$Ay = x + e \quad (5)$$

Equation (7) is an equation based on Equation (4) to serve as an equation expressing y ($=F_i$) in terms of matrix A which is constructed from matrix elements based on the horizontal movement quantity v and based on the weights $W_0$ to $W_8$ minimizing E where notation $F_i$ denotes the pixel value representing the pixel values $F_0$ to $F_9$.

$$E = \Sigma e_{mi}^2 + \Sigma (W_i e_{bi})^2 \quad (6)$$

$$y = (A^T A)^{-1} A_T x \quad (7)$$

It is to be noted that, in Equation (7), notation $A^T$ denotes the transposed matrix of the matrix A.

Equation (8) is an equation defining a processing coefficient w.

$$w = (A^T A)^{-1} A^T \quad (8)$$

The matrix (column vector) y on the left-hand side of Equation (7) represents the values $F_0$ to $F_9$ of the pixels $P_0$ to $P_9$ respectively as shown in FIG. 1 which shows the photographing object Ob in a standstill state. That is to say, the column vector y represents the supposed pixel values $F_0$ to $F_9$ with no blurring or blurring removed. On the other hand, the matrix (column vector) x on the right-hand side of Equation (7) represents the values $M_3$ to $M_9$ of the pixels $P_3$ to $P_9$ respectively as shown in FIG. 2 which shows the photographing object Ob moved by a horizontal movement quantity v of 4 pixels (v=4) in the horizontal direction within the shutter time. That is to say, the column vector x represents the actually measured pixel values $M_3$ to $M_9$.

Thus, if the processing coefficient w expressed by Equation (8) can be found in advance, by substituting the processing coefficient w and the matrix x representing the actually measured pixel values $M_0$ to $M_9$ into Equation (7), the matrix y representing ideal pixel values $F_0$ to $F_9$ of the pixels $P_0$ to $P_9$ respectively for the photographing object Ob with no blurring or blurring removed can be predicted. That is to say, Equation (7) can be interpreted as a prediction equation for inferring ideal pixel values. Thus, a process based on Equation (7) is a process of inferring ideal pixel values.

Figure 3:
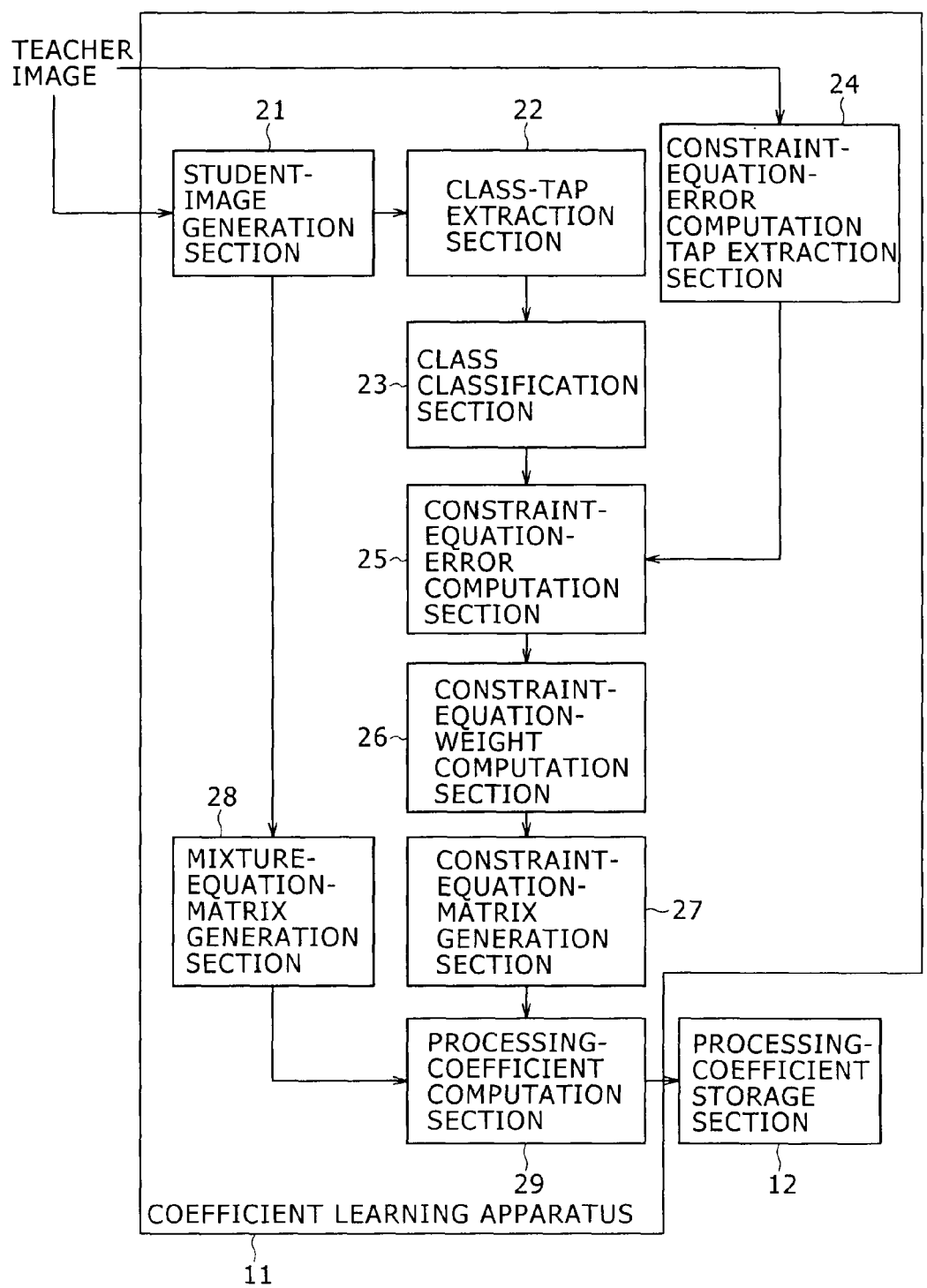
FIG. 3 is a block diagram showing a typical functional configuration of an information processing system employing a coefficient learning apparatus to which an embodiment of the present invention is applied.

As is obvious from the above description, in order to carry out a process of inferring a pixel value at the step SC, it is necessary to compute the processing coefficient w in advance and hold the coefficient. FIG. 3 is a block diagram showing a functional configuration of an information processing system employing a coefficient learning apparatus 11 and a processing-coefficient storage section 12. The coefficient learning apparatus 11 is an apparatus for learning the processing coefficient w by carrying out a coefficient learning process.

Incidentally, the information processing system shown in FIG. 3 and the information processing system shown in FIG. 9 described later can be constructed as the same system or constructed as systems independent of each other.

Figure 8:
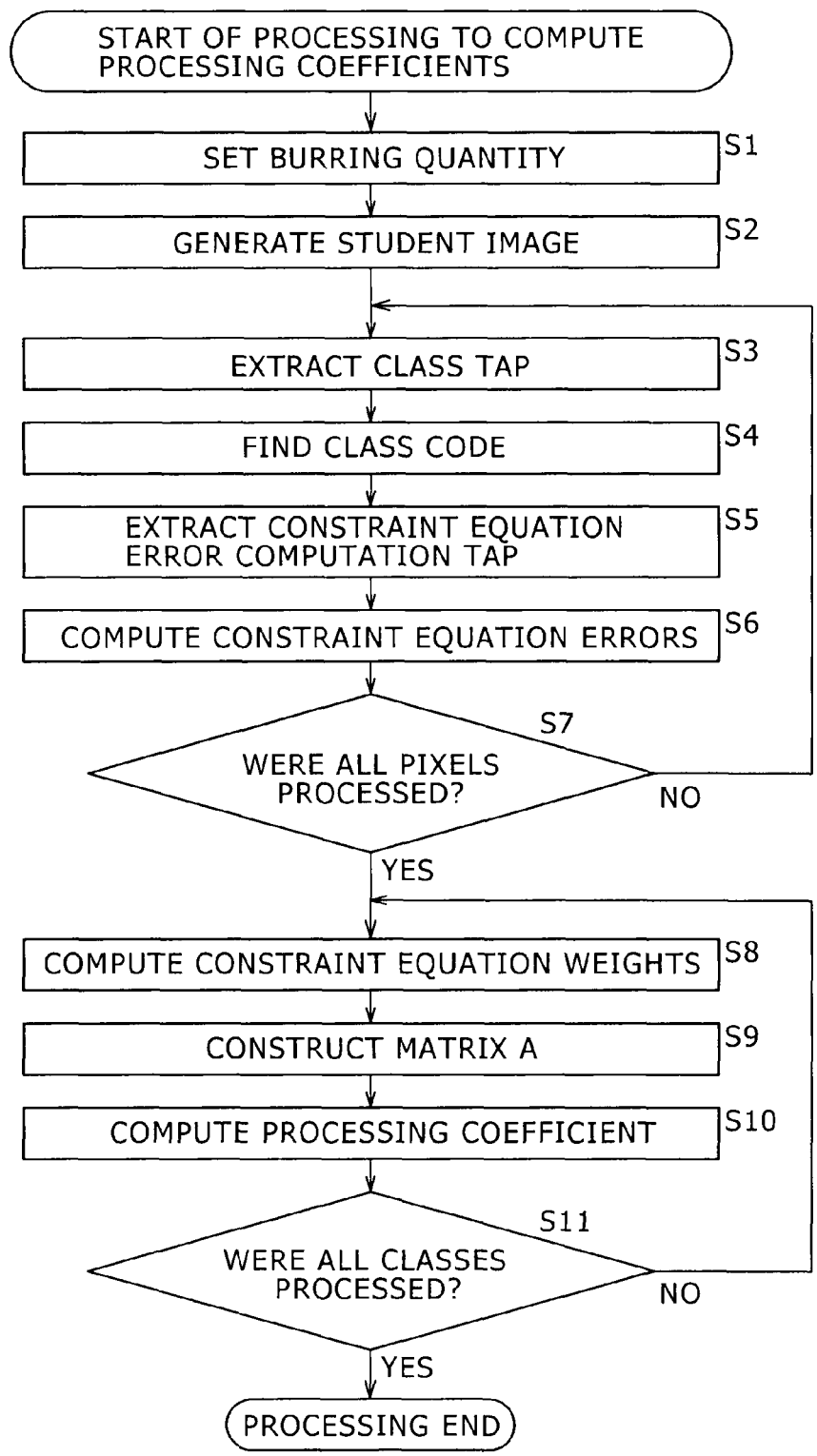
FIG. 8 shows a flowchart referred to in explanation of processing carried out by the coefficient learning apparatus shown in FIG. 3 to compute the processing coefficient.

FIG. 8 shows a flowchart representing processing to compute the processing coefficient w. As obvious from steps S9 and S10 of the flowchart, the processing coefficient w is computed from a matrix A which is found from the horizontal movement quantity v of the object of photographing and the weights $W_0$ to $W_8$ assigned to respectively constraint condition equations to result in weighted constraint condition equations. Since the horizontal movement quantity v is a known quantity, the processing coefficient w can be computed by finding the weights $W_i$ (that is, the weights $W_0$ to $W_8$ to be assigned to respectively constraint condition equations) by carrying out a weight learning process. Thus, an embodiment implementing the coefficient learning apparatus 11 included in the information processing system shown in the block diagram of FIG. 3 as an apparatus of the information processing system is configured to employ a student-image generation section 21, a class-tap extraction section 22, a class classification section 23, a constraint-equation-error computation tap extraction section 24, a constraint-equation-error computation section 25, a constraint-equation-weight computation section 26, a constraint-equation-matrix generation section 27, a mixture-equation-matrix generation section 28 and a processing-coefficient computation section 29 which are sections for learning the weights $W_0$ to $W_8$ by carrying out a weight learning process.

The coefficient learning apparatus 11 receives a teacher image corresponding to an image taken from a still photographing object in a photographing operation, supplying the teacher image to the student-image generation section 21 and the constraint-equation-error computation tap extraction section 24.

The student-image generation section 21 generates a student image conforming to a blurring model from the teacher image. That is to say, the student-image generation section 21 generates a student image from the teacher image by forcibly adding blurring to the teacher image. The student-image generation section 21 supplies the student image to the class-tap extraction section 22. In other words, the student-image generation section 21 creates an image pair of a teacher image and a student image.

The class-tap extraction section 22 extracts a class tap from the student image and supplies the class tap to the class classification section 23 as follows. A class tap represents a plurality of pixels included in the student image. Normally, a pixel included in the teacher image is taken as a pixel of interest in the coefficient learning process. In the following description, a pixel included in the teacher image as a pixel interested in the coefficient learning process is referred to as a pixel of interest. The class tap extracted by the class-tap extraction section 22 from the student image are student pixels located at position corresponding to the position of the pixel of interest and peripheral positions surrounding the position of the pixel of interest. The class tap is a pixel group extracted from the student image as pixels required in a process of predicting the value of the pixel of interest. The class-tap extraction section 22 supplies the class tap to the class classification section 23.

The class classification section 23 carries out a class classification process of determining a class for the pixel of interest on the basis of, among others, the feature quantity of the class tap extracted for the pixel of interest.

It is to be noted that the technique itself adopted for the class classification process is not specially prescribed. For example, an ADRC (Adaptive Dynamic Range Coding) class classification technique can be adopted. It is to be noted that, in the case of this embodiment, the ADRC class classification technique is typically adopted.

In accordance with the method for determining a class for a pixel of interest by adoption of the ADRC technique, pixels extracted from in the student image as a class tap are subjected to an ADRC process carried out by the class classification section 23 and the class of the pixel of interest is determined in accordance with an ADRC code which is obtained as a result of the ADRC process as follows.

It is to be noted that, in a K-bit ADRC process, a maximum pixel value MAX and a minimum pixel value MIN are detected among the values of a plurality pixels extracted from the student image as a class tap. The difference DR between the maximum pixel value MAX and the minimum pixel value MIN (that is, DR=MAX−MIN) is used as the local dynamic range of a set of the pixels extracted from the student image as a class tap. On the basis of this dynamic range DR, each of the pixels extracted from the student image as a class tap is re-quantized into K bits. That is to say, the minimum pixel value MIN is subtracted from each of the values of the pixels extracted from the student image as a class tap, and each of the pixel values obtained as a result of the subtraction operation is divided (or re-quantized) by $DR/2^K$. Then, a bit string resulting from an operation to arrange the K-bit pixel values, which have been produced by the re-quantization operation, in order determined in advance is used as an ADRC code. Thus, in the case of a 1-bit ADRC process carried out on a class tap, for example, the minimum pixel value MIN is subtracted from each of the values of the pixels extracted from the student image as the class tap, and each of the pixel values obtained as a result of the subtraction operation is divided by DR/2 to generate 1-bit pixel values each have a binary value obtained by truncating the decimal point of the result of the division operation. That is to say, each of the pixel values is converted into a 1-bit pixel value in a binary conversion process. Then, a bit string resulting from an operation to arrange the 1-bit pixel values in an order determined in advance is used as an ADRC code.

In the mean time, the constraint-equation-error computation tap extraction section 24 extracts a constraint condition equation error computation tap from the teacher image and supplies the constraint equation error computation tap to the constraint-equation-error computation section 25. The constraint equation error computation tap is, for example, a group of the pixel of interest in the teacher image and pixels surrounding the pixel of interest. To put it concretely, the constraint equation error computation tap is a group of the pixels $P_0$ to $P_9$ having pixel values $F_0$ to $F_9$ respectively as shown in the diagram of FIG. 1. It is to be noted that, in this case, the pixel of interest is typically a pixel in the middle of the pixels $P_0$ to $P_9$.

Thus, the constraint-equation-error computation section 25 receives the class tap from the class classification section 23 and the constraint equation error computation tap from the constraint-equation-error computation tap extraction section 24. That is to say, the constraint-equation-error computation section 25 receives a class tap for each class and a constraint condition equation error computation tap corresponding to the class tap.

For each class, the constraint-equation-error computation section 25 computes constraint equation errors $e_{b0}$ to $e_{b8}$ in the neighborhood of the pixel of interest in the teacher image in accordance with Equation (9) given below. The constraint-equation-error computation section 25 supplies the computed constraint equation errors $e_{b0}$ to $e_{b8}$ to the constraint-equation-weight computation section 26.

$$F_0 - F_1 = e_{b0} \qquad (9)$$
$$F_1 - F_2 = e_{b1}$$
$$F_2 - F_3 = e_{b2}$$
$$\vdots$$
$$F_8 - F_9 = e_{b8}$$

Figure 4:
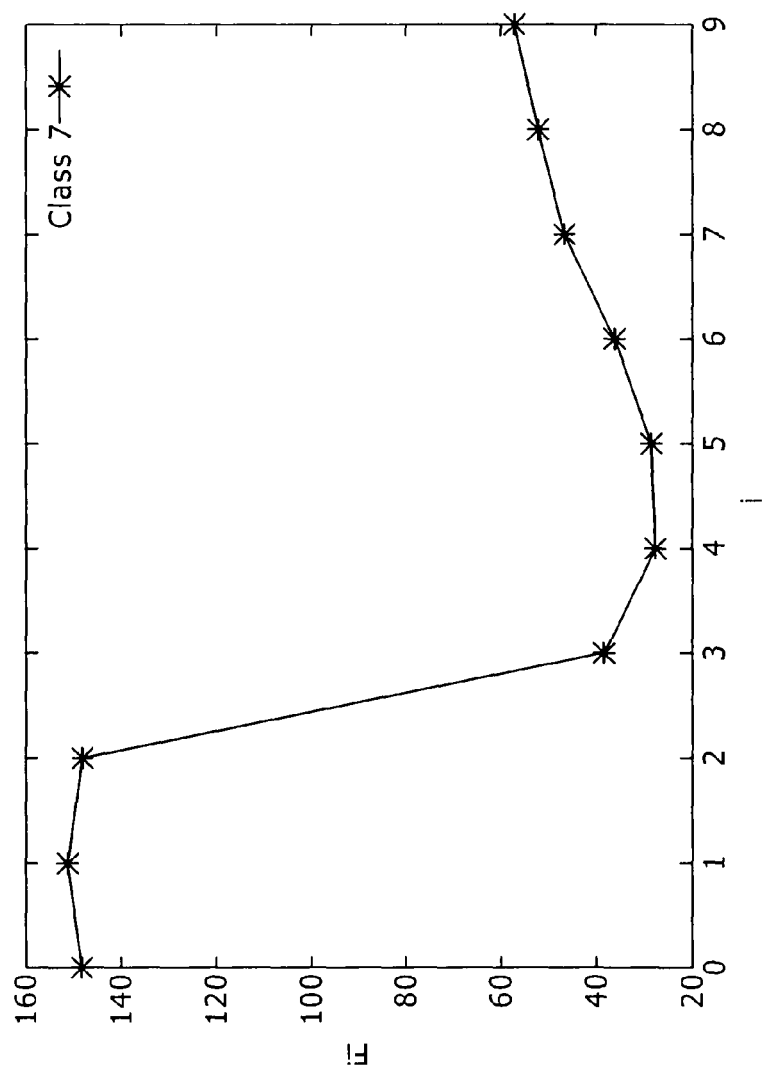
FIG. 4 is a diagram showing a curve representing a relation between the position of a pixel and the value of the pixel.
Figure 5:
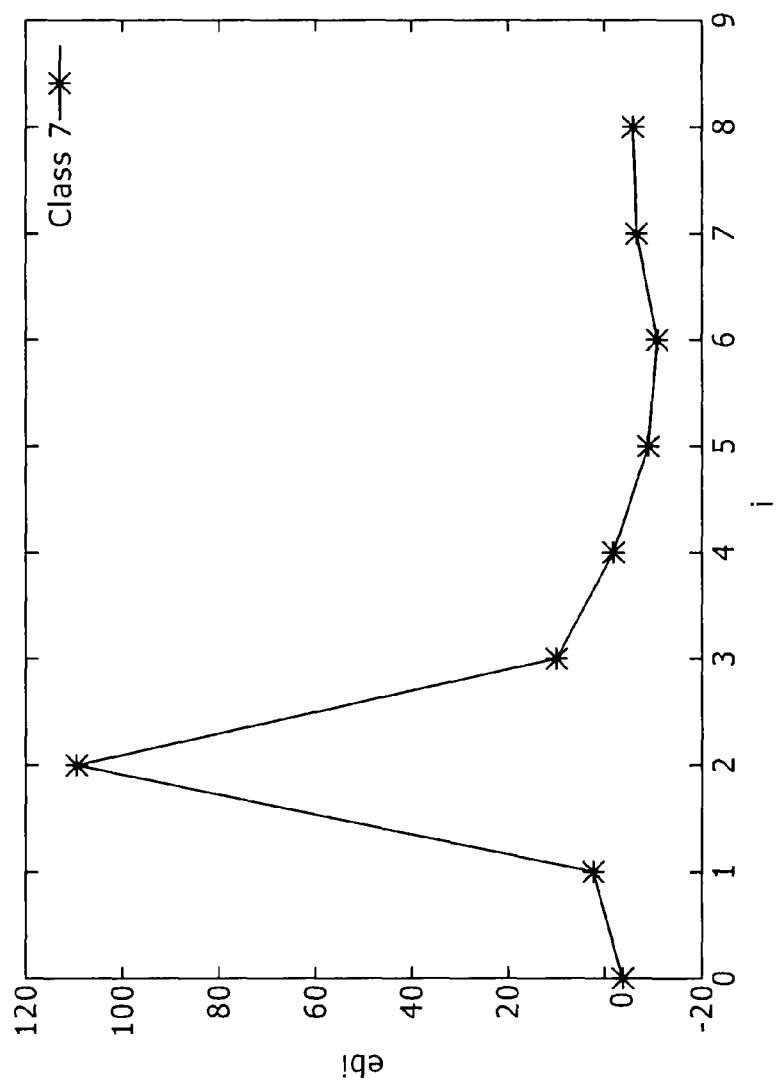
FIG. 5 is a diagram showing a curve representing a relation between the position of a pixel shown in the diagram of FIG. 4 and a constraint equation error for the pixel and an adjacent pixel.

As a concrete example, let us assume that the waveform of a curve representing the pixel values $F_0$ to $F_9$ of the constraint equation error computation tap is shown in FIG. 4. The pixel values $F_0$ to $F_9$ are respectively the values of the pixels $P_0$ to $P_9$ located in the vicinity of the pixel $P_6$ which is selected as a pixel of interest. In FIG. 4, the horizontal axis represents pixels $P_i$. On the other hand, the vertical axis represents the pixel value $F_i$. It is to be noted that each of the horizontals of FIGS. 5 to 7 to be described later also represents $P_i$ and $F_i$ in the same way as the horizontal axis of FIG. 4. FIG. 5 is a diagram showing the errors $e_{b0}$ to $e_{b8}$ computed by the constraint-equation-error computation section 25 in accordance with Equation (9).

For each class, the constraint-equation-weight computation section 26 computes the weight $W_i$ of the constraint condition equation from the errors $e_{b0}$ to $e_{b8}$ of the constraint condition equation in accordance with Equation (10) given below and supplies the weight $W_i$ to the constraint-equation-matrix generation section 27.

$$W_i = \frac{1}{\sqrt{\sum^{sample} e_{bi}^2}} \qquad (10)$$

Figure 6:
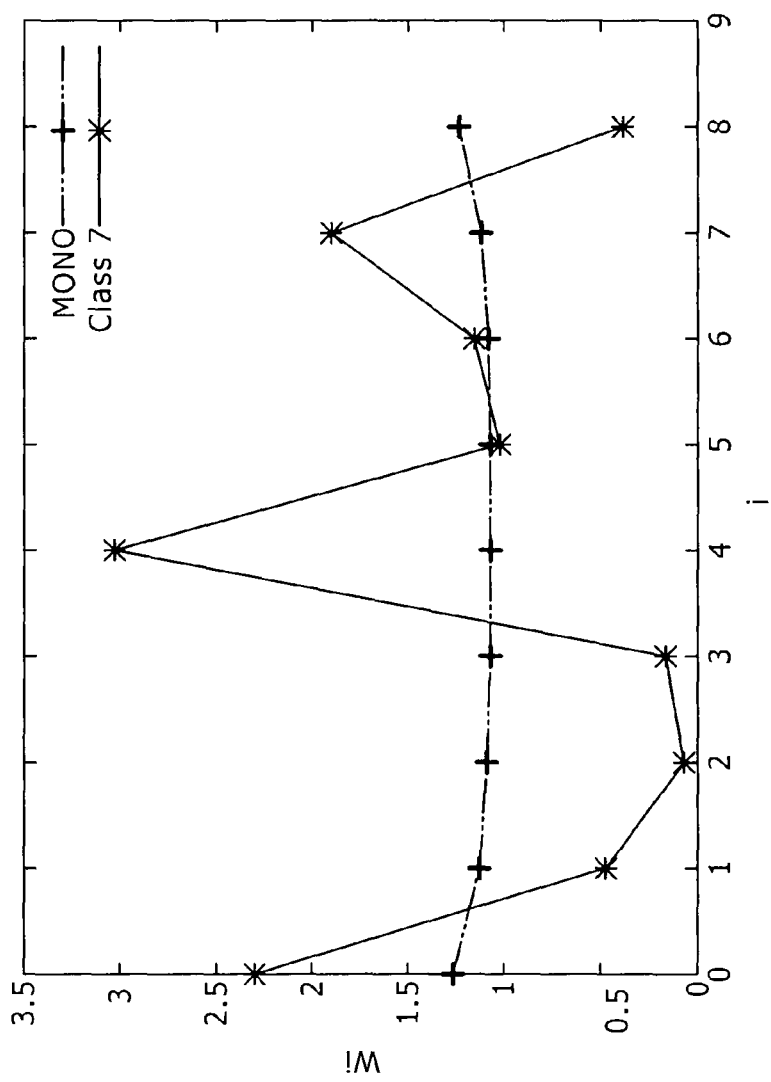
FIG. 6 is a diagram showing a curve representing a relation between the position of a pixel shown in the diagram of FIG. 4 and a constraint equation weight for the constraint equation error.

The weights computed from the errors $e_{b0}$ to $e_{b8}$ of the constraint condition equation in accordance with Equation (10) as the weight $W_i$ of the constraint condition equation are represented by a solid line shown in FIG. 6. It is to be noted that a dotted line shown in FIG. 6 as a line for comparison represents a weight $W_i$ for constraint condition equation in a mono-class case. On the other hand, the solid line represents a weight $W_i$ for constraint condition equation in the case of a class for the pixel $P_6$ serving as a pixel of interest in the teacher image.

As shown in Equation (11), each of the weighted error sums $E_{b0}$ to $E_{b1}$ for the constraint condition equation has the same value of 1 independently of the value of the number i, meaning that the squared weight $W_i$ has an effect as if a uniform error sum were statistically spread among all neighboring pixels $P_i$.

$$E_{bi} = W_i^2 \sum^{sample} e_{bi}^2 = \left(\frac{1}{\sqrt{\sum^{sample} e_{bi}^2}}\right)^2 \sum^{sample} e_{bi}^2 = 1 \qquad (11)$$

It is to be noted that techniques each adopted by the constraint-equation-weight computation section 26 as a technique for computing the weight $W_i$ for the constraint condition equation are not limited to the weight computation technique based on Equation (10). That is to say, any weight computation technique can be adopted as far as the technique which gives a weight $W_i$ exhibiting such a trend that, the larger the absolute value of the error $e_{bi}$, the smaller the value of the weight $W_i$. As an example, the technique adopted by the constraint-equation-weight computation section 26 as a technique for computing the weight $W_i$ for the constraint condition equation can be a weight computation technique based on Equation (12) given as follows.

$$W_j = \frac{1}{\sqrt{\sum^{sample} |e_{bi}^3|}}. \qquad (12)$$

The matrix A used in Equation (5) includes an upper block matrix above a dashed line crossing the left matrix A on the left-hand side of the equation expressed by Equation (4) and a lower block matrix above the dashed line. In the following description, the upper block matrix above the dashed line crossing the left matrix A is referred to as a mixture equation block matrix whereas the lower block matrix below the dashed line crossing the left matrix A is referred to as a constraint equation block matrix.

The constraint-equation-matrix generation section 27 constructs the constraint equation block matrix from matrix elements based on the weight $W_i$ as a weight assigned to the expression of the constraint condition equation for every class and supplies the constraint equation block matrix to the processing-coefficient computation section 29.

In the mean time, the mixture-equation-matrix generation section 28 constructs the mixture equation block matrix and supplies the mixture equation block matrix to the processing-coefficient computation section 29. It is to be noted that the horizontal movement quantity v is determined on the basis of a deterioration model (blurring in this case) applied to the process carried out by the student-image generation section 21 to generate a student image. Thus, the mixture-equation-matrix generation section 28 constructs the mixture equation block matrix for every pair of student and teacher images. That is to say, the mixture-equation-matrix generation section 28 constructs the mixture equation block matrix independently of a class.

The processing-coefficient computation section 29 constructs a matrix A from the constraint equation block matrix and the mixture equation block matrix for each class. Then, the processing-coefficient computation section 29 computes a processing coefficient w from the matrix A in accordance with Equation (8) for each class and stores the processing coefficient w in the processing-coefficient storage section 12.

Figure 7:
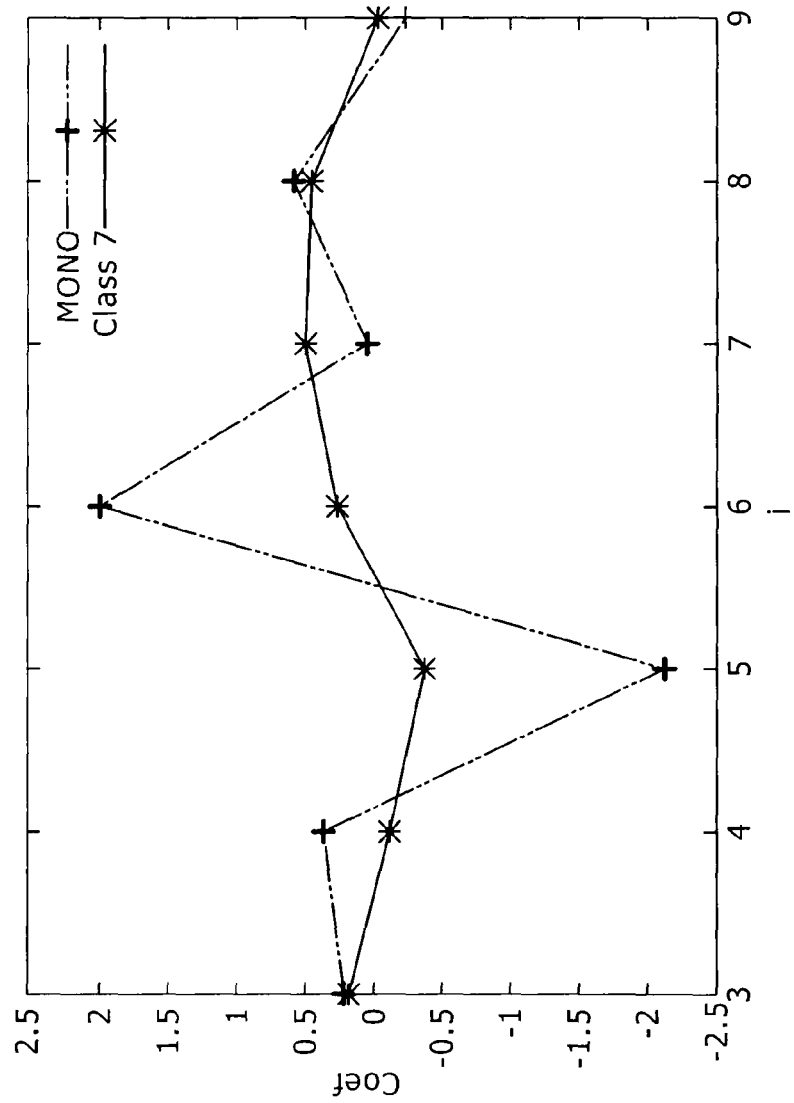
FIG. 7 is a diagram showing a curve representing a relation between the position of a pixel shown in the diagram of FIG. 4 and a processing coefficient.

To put it concretely, the elements of the processing coefficient w computed by making use of the weight $W_i$ shown by the solid line in FIG. 6 are represented by a solid line in a diagram of FIG. 7. It is to be noted that a dotted line shown in FIG. 7 as a line for comparison represents the elements of the processing coefficient w in a mono-class case. On the other hand, the solid line shown in FIG. 7 represents the processing coefficient w in the case of a class for the pixel $P_6$ serving as a pixel of interest in the teacher image.

FIG. 8 shows a flowchart explaining typical processing carried out by the coefficient learning apparatus 11, which has the functional configuration shown in FIG. 3.

The flowchart begins with a step S1 at which the student-image generation section 21 sets a blurring quantity.

Then, at the next step S2, the student-image generation section 21 generates a student image.

After the student image is generated as described above, a pixel is selected from pixels of the teacher image to be used as a pixel of interest and processes of following steps S3 to S7 are carried out for the pixel of interest.

To be more specific, at the step S3, the class-tap extraction section 22 extracts a class tap for the pixel of interest from the student image.

Then, at the next step S4, the class determination classification section 23 determines a class code for the pixel of interest.

Subsequently, at the next step S5, the constraint-equation-error computation tap extraction section 24 extracts a constraint condition equation error computation tap for the pixel of interest from the teacher image.

Then, at the next step S6, the constraint-equation-error computation section 25 computes constraint equation errors for the constraint equation error computation tap. To be more specific, in a process carried out at the step S6, the constraint-equation-error computation section 25 computes constraint equation errors $e_{b0}$ to $e_{b8}$.

Subsequently, at the next step S7, the coefficient learning apparatus 11 produces a result of determination as to whether or not each of the pixels of the teacher image has been processed as a pixel of interest. If the determination result produced at the step S7 is NO, the flow of the processing-coefficient generation processing goes back to the step S3 to repeat the processes described above.

That is to say, another pixel is selected from pixels of the teacher image created at the step S2 to be used as a pixel of interest and the processes of the steps S3 to S7 are repeated till the determination result produced at the step S7 becomes YES indicating that the last pixel of the teacher image has been processed in the processes including that of the step S6. With the determination result produced at the step S7 becoming YES, the flow of the processing-coefficient generation processing goes on to a step S8.

That is to say, processes of steps S8 to S11 are carried out. To be more specific, at the step S8, the constraint-equation-weight computation section 26 computes the weight $W_i$ for a class code representing a class from the constraint equation errors $e_{b0}$ to $e_{b8}$.

Then, at the next step S9, the constraint-equation-matrix generation section 27, the mixture-equation-matrix generation section 28, and the processing-coefficient computation section 29 construct the matrix A from matrix elements. Subsequently, at the step S10, the processing-coefficient computation section 29 computes the processing coefficient w from the matrix A.

Then, at the next step S11, the coefficient learning apparatus 11 produces a result of determination as to whether or not a processing coefficient w has been computed for each class code representing a class. If the determination result produced at the step S11 is NO, the flow of the processing-coefficient generation processing goes back to the step S8 to repeat the processes described above.

As a matter of fact, a loop of the processes of the steps S8 to S11 is executed repeatedly. As the process of the step S10 has been carried out for the last class code, the determination result produced at the step S11 becomes YES. In this case, the processing-coefficient generation processing is ended.

Figure 9:
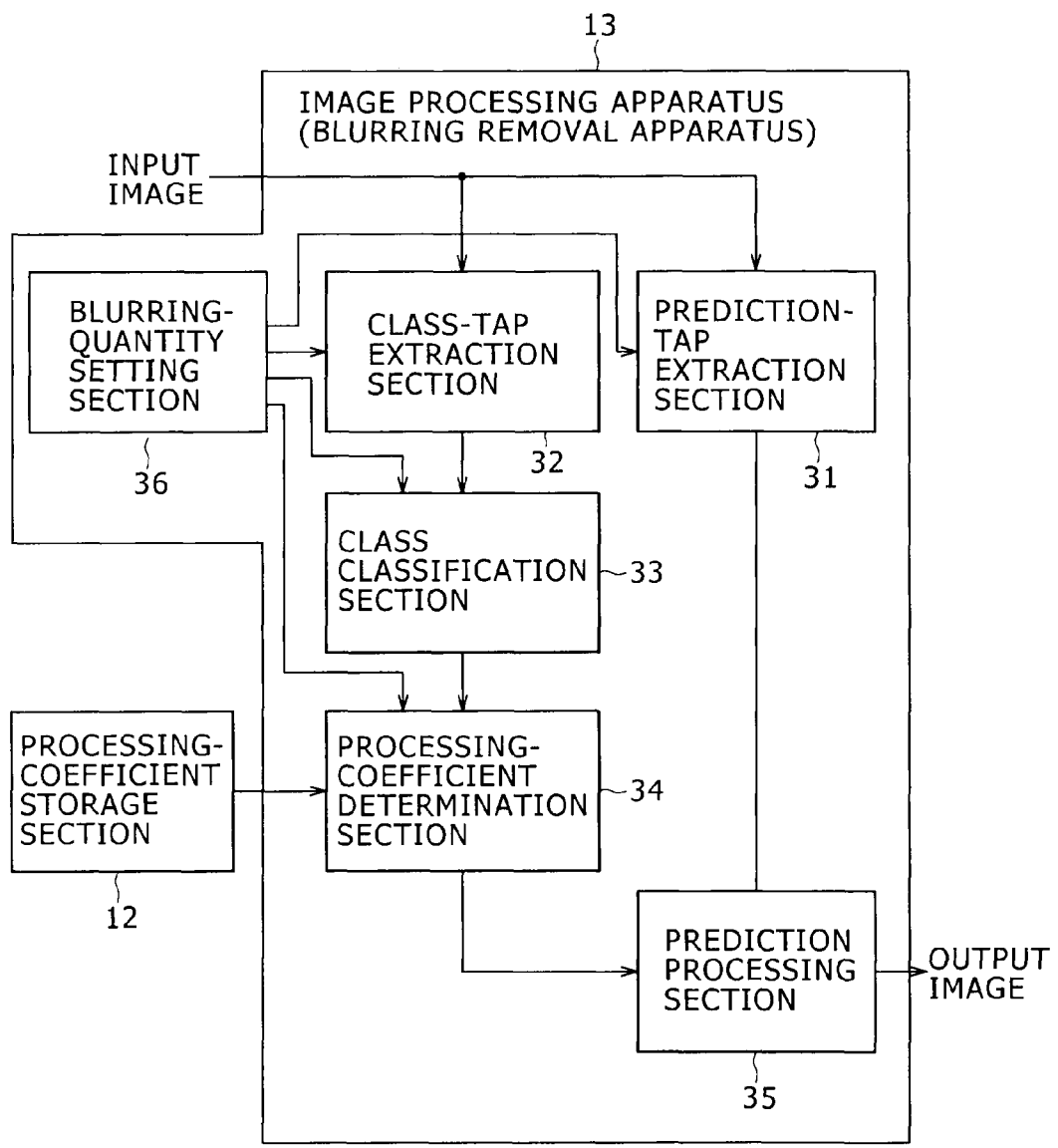
FIG. 9 is a block diagram showing a typical functional configuration of an information processing system employing an image processing apparatus to which an embodiment of the present invention is applied.

FIG. 9 is a functional block diagram showing a typical functional configuration of the image processing apparatus 13.

The image processing apparatus 13 carries out image processing on an input image by making use of a processing coefficient w, which has been generated in advance by the coefficient learning apparatus 11 included in the information processing system shown in FIG. 3 for each class and stored in the processing-coefficient storage section 12. To put it concretely, the image processing carried out by the embodiment implementing the image processing apparatus 13 is processing to eliminate blurring from the input image. For this reason, the typical image processing apparatus 13 is also referred to as a blurring removal apparatus put in parentheses as shown in FIG. 9.

The image processing apparatus 13 is configured to employ sections including a prediction-tap extraction section 31, a class-tap extraction section 32, a class determination section 33, a processing-coefficient determination section 34, a processing section 35 and a blurring-quantity setting section 36.

The prediction-pixel extraction section 31 extracts a plurality of pixels included in the input image as a group of student pixels located at positions corresponding to the position of the pixel of interest and peripheral positions surrounding the position of the pixel of interest as a prediction tap. It is to be noted that the number of pixels represented by the prediction tap may vary in accordance with a blurring quantity received from by the blurring-quantity setting section 36.

The class-tap extraction section 32 extracts a plurality of pixels included in the input image as a group of student pixels located at positions corresponding to the position of the pixel of interest and peripheral positions surrounding the position of the pixel of interest as a class tap. It is to be noted that the number of pixels represented by the prediction tap may vary in accordance with a blurring quantity received from by the blurring-quantity setting section 36.

It is also worth noting that, in order to make the explanation simple, the prediction tap is assumed to have the same structure as the class tap. However, it is also possible to provide a configuration in which the prediction tap has a structure different from that of the class tap.

The class setting section 33 determines a class in accordance with the values of the pixels extracted by the class-tap extraction section 32 as the class tap. The class determination section 33 supplies the class code of the class to the processing-coefficient determination section 34. It is to be noted that the class code representing the class may vary in accordance with the blurring quantity received from the blurring-quantity setting section 36.

The method for determining a class to classify the pixel of interest is not prescribed in particular. It is desirable, however, to adopt the same method as the class classification section 23 employed in the coefficient learning apparatus 11 shown in FIG. 3. For this reason, the class determination section 33 is assumed to also adopt the ADRC class-classification method adopted by the class classification section 23.

The processing-coefficient determination section 34 searches the processing-coefficient storage section 12 for a processing coefficient w corresponding to the class code received from the class determination section 33 and supplies the processing coefficient w to the prediction processing section 35 as a coefficient to be used in a process to predict the value of a pixel of interest. As described above, however, the class code representing the class may vary in accordance with a blurring quantity set by the blurring-quantity setting section 36. Thus, in this case, the processing-coefficient determination section 34 determines a processing coefficient w corresponding to the class code and a blurring quantity received from the blurring-quantity setting section 36.

The prediction processing section 35 predicts the true value of the pixel of interest by carrying out a computation process according to Equation (7) on a processing coefficient w received from the processing-coefficient determination section 34 and the prediction tap from the prediction-tap extraction section 31. The true value of the pixel of interest is a pixel value with blurring eliminated from the image.

The blurring-quantity setting section 36 carries out a process of setting a blurring quantity. The process of setting a blurring quantity is a process of a wide concept including an analysis of the input image and determination of the blurring quantity in accordance with the result of the analysis. The meaning of the process of setting a blurring quantity is applied to the following description.

Figure 10:
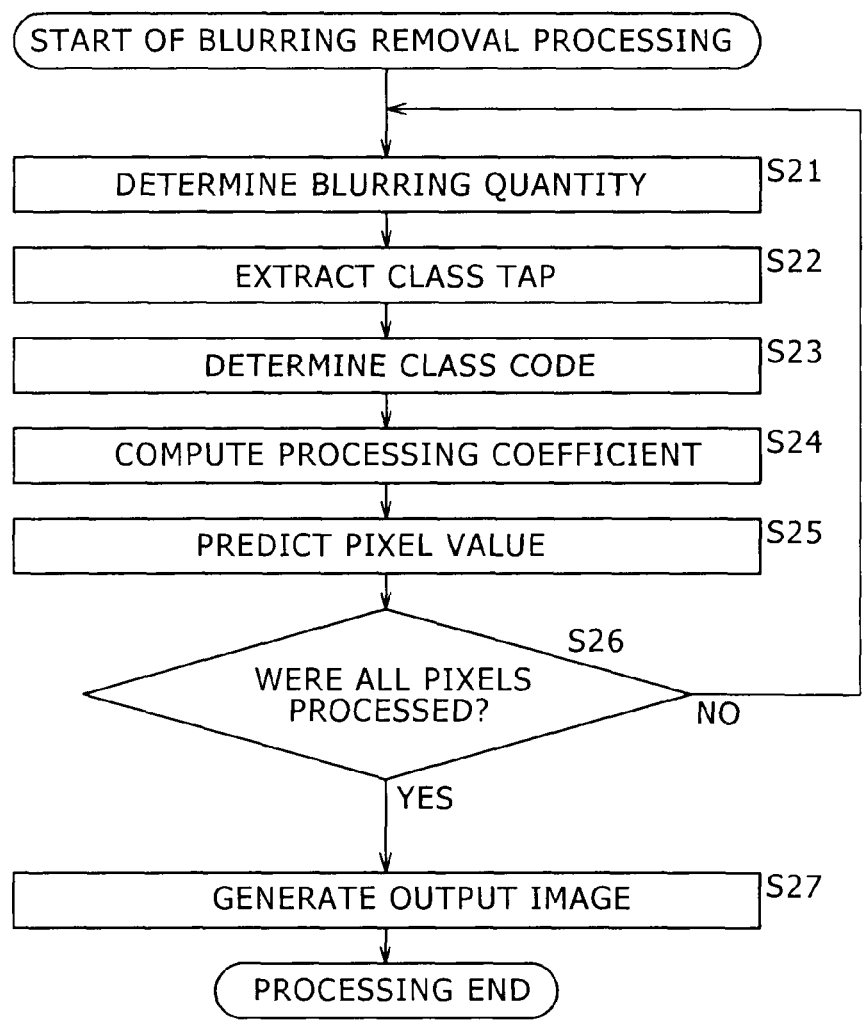
FIG. 10 shows a flowchart referred to in explanation of typical processing carried out by the image processing apparatus having the functional configuration shown in FIG. 9 to eliminate blurring from an input image.

FIG. 10 shows a flowchart referred to in explanation of typical processing carried out by the image processing apparatus 13 having the functional configuration shown in FIG. 9 to eliminate blurring from an input image.

A pixel of an input image to be generated is taken as a pixel of interest and the pixel of interest is subjected to processes carried out at steps S21 to S26 of the flowchart as follows.

At the first step S21, the blurring-quantity setting section 36 determines a blurring quantity for the pixel of interest in the input image.

Then, at the next step S22, the class-tap extraction section 32 extracts a plurality of pixels included in the input image.

Subsequently, at the next step S23, the class determination section 33 finds the class code of the pixel of interest.

Then, at the next step S24, the processing-coefficient determination section 34 selects a processing coefficient w for the pixel of interest.

Subsequently, at the next step S25, the prediction processing section 35 carries out a prediction process of finding the values $F_i$ of pixels $P_i$ in the output image which is an image obtained as a result of the blurring removal processing.

Then, at the next step S26, the image processing apparatus 13 produces a result of determination as to whether or not all the pixels composing the output data being generated have been subjected to the processes of the steps S21 to S25. If the determination result produced at the step S26 is NO, the flow of the blurring removal processing goes back to the step S21 to repeat the processes described above.

If the determination result produced at the step S26 is YES meaning that all the pixels composing the output data being generated have been subjected to the processes of the steps S21 to S25, on the other hand, the flow of the blurring removal processing goes on to a step S27.

At the step S27, the prediction processing section 35 carries out a process of integrating all the pixels of interest completing the processes of the steps S21 to S25 into the output image which is an image obtained as a result of the blurring removal processing.

Finally, the blurring removal processing is ended.

As described so far, the information processing system shown in FIGS. 3 and 9 is capable of carrying out the blurring removal processing different from the blurring removal processing in related art. That is to say, the information processing system shown in FIGS. 3 and 9 carries out a coefficient learning process based on the constraint conditions in advance and stores a value found from the process in the processing-coefficient storage section 12 as the processing coefficient w. The processing coefficient w is computed by making use of weights $W_i$ found statistically in the coefficient learning process as weights assigned to the constraint conditions. Thus, the information processing system is capable of carrying out the blurring removal processing by making use of the constraint conditions. As a result, the information processing system is capable of carrying out the blurring removal processing at a low probability of failure in comparison with the blurring removal processing in related art.

Figure 11:
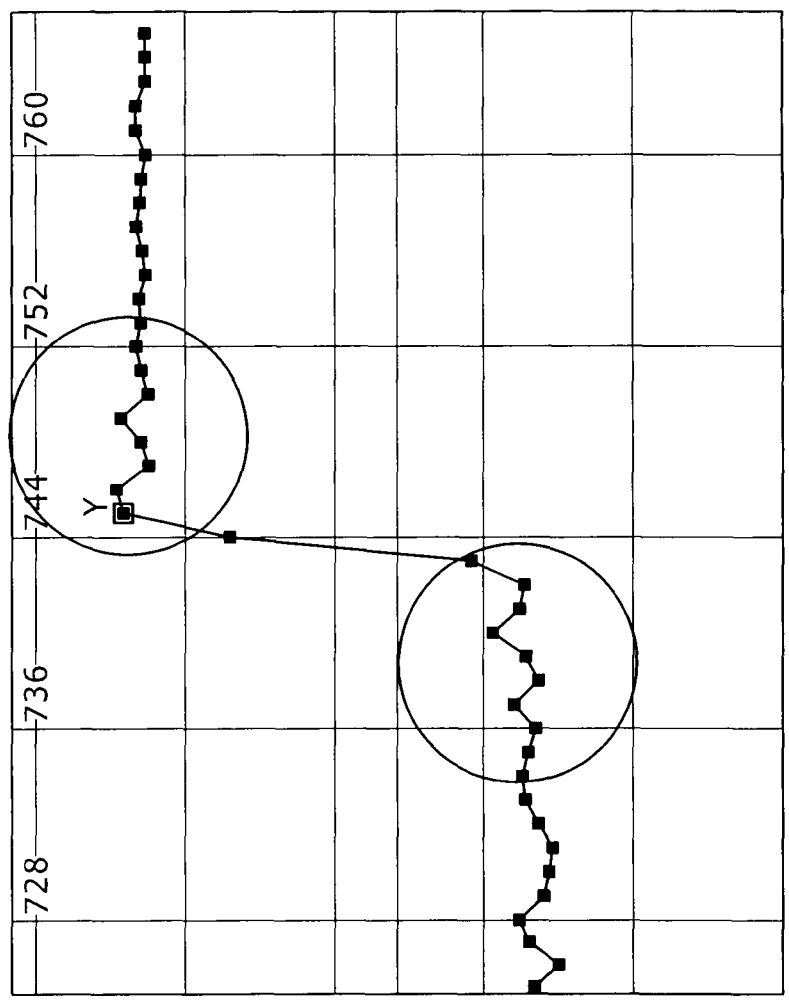
FIG. 11 is a diagram showing an image obtained as a result of blurring removal processing carried out on an input image on the basis of an average constraint condition applying the same weight for each of constraints.

To put it concretely, for example, FIG. 11 is a diagram showing an output image obtained as a result of the blurring removal processing carried out on an input image on the basis of an average constraint condition applying the same weight $W_i$ for each of constraints. The vertical axis of the diagram represents the pixel value whereas the horizontal axis represents an array of pixels arranged along a certain line. To be more specific, the horizontal axis represents an array of pixels ranging from pixel #725 to pixel #766. The vicinity of pixel #744 is an edge. Values of pixels located on the right-hand and left-hand sides of the edge are enclosed in circles. As shown in the figure, the pixel values enclosed in each of the circles vary from pixel to pixel, indicating that blurring is not removed well.

Figure 12:
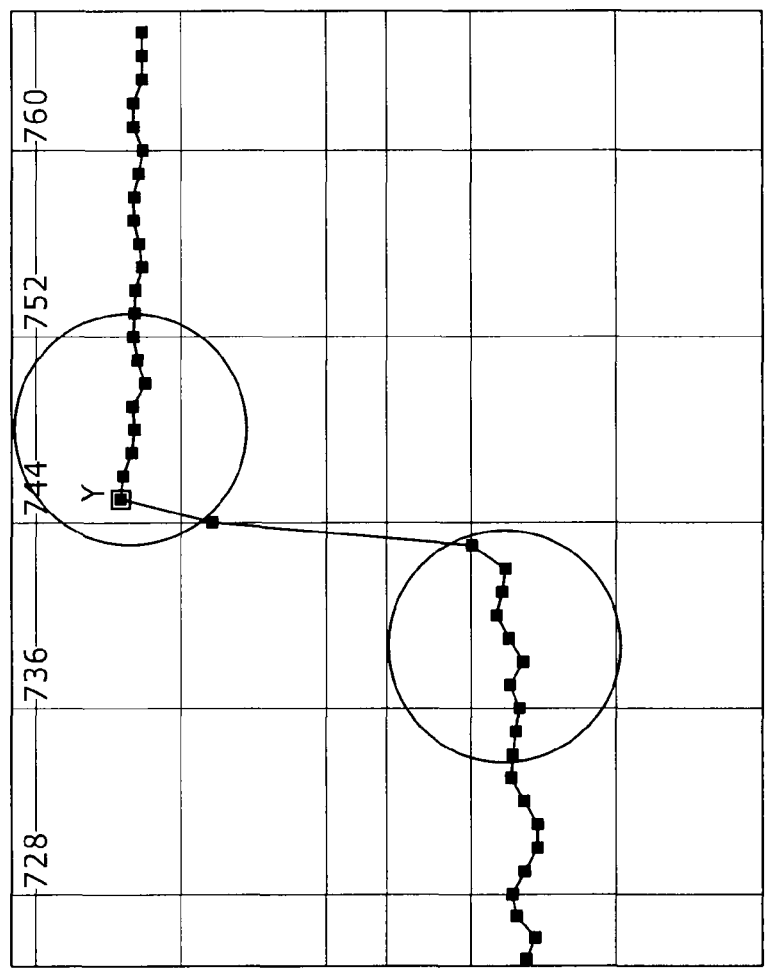
FIG. 12 is a diagram showing an image obtained as a result of blurring removal processing carried out by the information processing system shown in FIGS. 3 and 9, namely, an image obtained as a result of blurring removal processing carried out on an input image on the basis of a constraint condition to which an embodiment of the present invention is applied.

On the other hand, FIG. 12 is a diagram showing an image obtained as a result of the blurring removal processing carried out by the information processing system on the same input image as the diagram of FIG. 11. In this case, the blurring removal processing is carried out on the basis of the constraint conditions to which an embodiment of the present invention is applied. By the same token, the horizontal axis represents an array of pixels ranging from pixel #725 to pixel #766 and the vicinity of pixel #744 is an edge. Values of pixels located on the right-hand and left-hand sides of the edge are enclosed in circles. In this case, however, the pixel values enclosed in each of the circles do not vary much from pixel to pixel in comparison with the pixel values shown in FIG. 11. That is to say, the image represented by the pixel values shown in FIG. 12 appears to human eyes as an image close to a natural image in comparison with the image represented by the pixel values shown in FIG. 11.

An embodiment of the present invention applied to blurring removal processing has been described. However, the scope of the present invention is by no means limited to the blurring removal processing. That is to say, the present invention can be applied to various kinds of image processing. The following description explains an embodiment for a case in which an embodiment of the present invention is applied to density quadrupling processing.

The density quadrupling processing is processing to quadruple the resolution of an input image. That is to say, the density quadrupling processing is processing to convert an input image having a resolution equal to the standard resolution into an output image having a resolution equal to 4 times the standard resolution by generating a predicted image to serve as the output image.

It is to be noted that, in the following description, the input image having a resolution equal to the standard resolution is properly referred to as an SD (Standard Definition) image and pixels composing the SD image are referred to as SD pixels. To put it concretely, as an example, each of notations $M_0$ to $M_8$ shown in FIG. 13 denotes an SD pixel or the value of an SD pixel in the following description.

On the other hand, the output image having a high resolution is properly referred to as an HD (High Definition) image and pixels composing the HD image are referred to as HD pixels. To put it concretely, as another example, each of notations pixels $F_{0A}$ to $F_{8D}$ shown in FIG. 14 denotes an HD pixel or the value of an HD pixel in the following description. That is to say, the following description explains the density quadrupling processing to convert the SD image having the pixels $M_0$ to $M_8$ shown in FIG. 13 into the HD image having the pixels $F_{0A}$ to $F_{8D}$ shown in FIG. 14. In order to make the explanation simple, the following description explains the density quadrupling processing based on a process of projecting an HD image onto an SD image by making use of a model of taking an average of the values of 4 pixels in the HD image as the value of 1 pixel in the SD image.

The density quadrupling processing according to an embodiment of the present invention includes processes carried out at steps Sα to Sγ described below.

The step Sα is a step at which a process is carried out to establish projection condition equations.

To put it concretely, as an example, at the step Sα, a process is carried out to establish Equation (13) given below as equations expressing relations between the values $M_0$ to $M_8$ of the SD pixels composing the SD image shown in FIG. 13 and the values of the HD pixels $F_{0A}$ to $F_{8D}$ composing the HD image shown in FIG. 14.

$$M_0 = (F_{0A} + F_{0B} + F_{0C} + F_{0D})/4 \quad (13)$$
$$M_1 = (F_{1A} + F_{1B} + F_{1C} + F_{1D})/4$$
$$M_2 = (F_{2A} + F_{2B} + F_{2C} + F_{2D})/4$$
$$\vdots$$
$$M_8 = (F_{8A} + F_{8B} + F_{8C} + F_{8D})/4$$

The step Sβ is a step at which a process is carried out to establish constraint condition equations.

In this embodiment, at the step Sβ, a process is carried out to establish constraint condition equations expressed by Equation (14) as follows.

$$F_{0A} - F_{0B} = 0 \quad F_{0A} - F_{0C} = 0 \quad (14)$$
$$F_{0B} - F_{1A} = 0 \quad F_{0C} - F_{3A} = 0$$

-continued $$F_{1A} - F_{1B} = 0 \quad F_{3A} - F_{3C} = 0$$
$$\vdots \quad \vdots$$
$$F_{8C} - F_{8D} = 0 \quad F_{8B} - F_{8D} = 0$$

Figure 14:
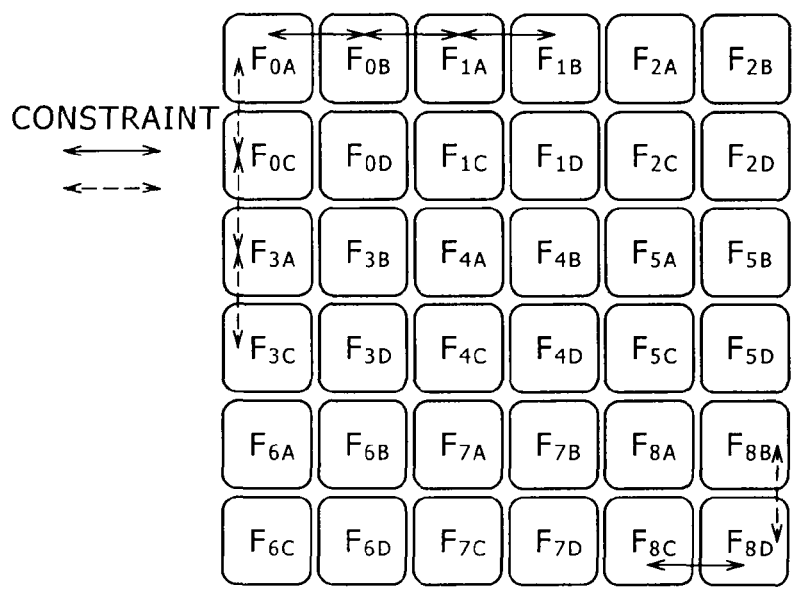
FIG. 14 is a diagram showing typical values of pixels composing an HD (High Definition) image.

In Equation (14), each of constraint condition equations on the left-hand side is a constraint equation in the horizontal direction which is the direction of solid-line arrows shown in FIG. 14. On the other hand, each of constraint condition equations on the right-hand side is a constraint equation in the vertical direction which is the direction of dashed-line arrows shown in FIG. 14.

It is to be noted that the constraint condition equations are by no means limited to vertically and horizontally independent equations such as those expressed by Equation (14). To put it concretely, for example, constraint condition equations expressed by Equation (15) given below can also be used.

$$-F_{0B}-F_{0C}+4F_{0D}-F_{1C}-F_{3B}=0 \quad (15)$$

The step Sγ is a step at which a process is carried out to infer pixel values.

Equation (16) is obtained by combining Equation (15) with Equation (14). Equation (16) is an equation representing relations among the SD pixel values $M_3$ to $M_9$, the HD pixel values $F_{0A}$ to $F_{8D}$, and the weights $W_{0A\text{-}0B}$ to $W_{8B\text{-}8D}$.

$$\begin{bmatrix} 1/4 & 1/4 & 1/4 & 1/4 & 0 & 0 & 0 & 0 & \ldots & 0 & 0 & 0 & 0 \\ 0 & 0 & 0 & 0 & 1/4 & 1/4 & 1/4 & 1/4 & \ldots & 0 & 0 & 0 & 0 \\ & & & & & & & & \ddots & & & & \\ 0 & 0 & 0 & 0 & 0 & 0 & 0 & 0 & \ldots & 1/4 & 1/4 & 1/4 & 1/4 \\ W_{0A-0B} & -W_{0A-0B} & 0 & 0 & 0 & 0 & 0 & 0 & \ldots & 0 & 0 & 0 & 0 \\ 0 & W_{0B-1A} & 0 & 0 & -W_{0B-1A} & 0 & 0 & 0 & \ldots & 0 & 0 & 0 & 0 \\ & & & & & & & & \ddots & & & & \\ 0 & 0 & 0 & 0 & 0 & 0 & 0 & 0 & \ldots & 0 & W_{8B-8D} & 0 & -W_{8B-8D} \end{bmatrix} \begin{bmatrix} F_{0A} \\ F_{0B} \\ F_{0C} \\ F_{0D} \\ F_{1A} \\ F_{1B} \\ F_{1C} \\ F_{1D} \\ \vdots \\ F_{8A} \\ F_{8B} \\ F_{8C} \\ F_{8D} \end{bmatrix} = \begin{bmatrix} M_0 \\ M_1 \\ \vdots \\ M_8 \\ 0 \\ 0 \\ \vdots \\ 0 \end{bmatrix} + \begin{bmatrix} e_{m0} \\ e_{m1} \\ \vdots \\ e_{m8} \\ W_{0A-0B}e_{b(0A-0B)} \\ W_{0B-1A}e_{b(0B-1A)} \\ \vdots \\ W_{8B-8D}e_{b(8B-8D)} \end{bmatrix} \quad (16)$$

In this case, let a left matrix on the left-hand side of the equation be denoted by notation A, a right matrix (or a column vector) on the left-hand side of the equation be denoted by notation y, a matrix (or a column vector) serving as the first term (the term on the left-hand side of an operator+) on the right-hand side of the equation be denoted by notation x and a matrix (or a column vector) serving as the second term (the term on the right-hand side of the operator+) on the right-hand side of the equation be denoted by notation e. In this case, the equation expressed by Equation (16) can be rewritten into Equation (5) given earlier for the blurring removal processing. This means that the processing coefficient w for the density quadrupling can be found in exactly the same way as the computation process included in the blurring removal processing to find the processing coefficient w. That is to say, the configuration of a coefficient learning apparatus for finding the processing coefficient w for the density quadrupling processing is basically identical with the configuration of the coefficient learning apparatus 11 shown in FIG. 3 except that an HD image is used as a teacher image whereas an SD image is used as a student image. In addition, the configuration of an image processing apparatus for carrying out a pixel-value prediction process in the density quadrupling processing is basically identical with the configuration of the image processing apparatus 13 shown in FIG. 9 except that an SD image is used as an input image.

Figure 13:
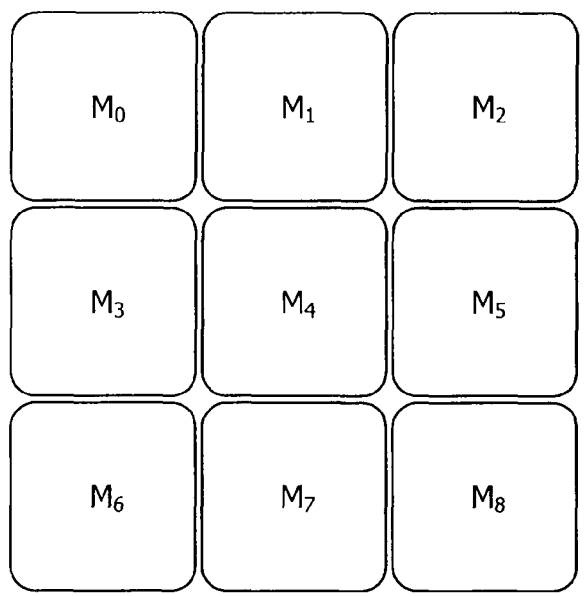
FIG. 13 is a diagram showing typical values of pixels composing an SD (Standard Definition) image.

Incidentally, the blurred image shown in FIG. 2 can be regarded as a deteriorating image of the unblurred image shown in FIG. 1 and, by the same token, the SD image shown in FIG. 13 can be regarded as a deteriorating image of the HD image shown in FIG. 14. With a blurred image regarded as a deteriorating image of an unblurred image and an SD image regarded as a deteriorating image of an HD image in this way, in the coefficient learning processing for generating the processing coefficient w, a student image representing deteriorating images such as the blurred image and the SD image can be said to be an image generated from a teacher image representing original images such as the unblurred image and the HD image on the basis of a deterioration model determined in advance. That is to say, a variety of embodiments each implementing a coefficient learning apparatus as described above can each be said to be an embodiment capable of generating a processing coefficient w for the type of the model of deterioration such as blurring and reducing.

Thus, the coefficient learning apparatus to which an embodiment of the present invention is applied can have any configuration of as long as: a student image, which has a quality degraded from the quality of a teacher image, is generated from the teacher image; each of pixels in the teacher image is sequentially set as a pixel of interest and a class is generated for the pixel of interest from the values of a plurality of specific pixels included in the student image as student pixels located at positions corresponding to the position of the pixel of interest in the teacher image and peripheral positions surrounding the position of the pixel of interest; feature quantities such as value differences representing relations between the values of at least some particular pixels included in the teacher image and pixels adjacent to the particular pixels as well as used as the pixel of interest and pixels adjacent to the pixel of interest in the deterioration model equations used for finding the values of the specific pixels from the values of the pixel of interest and the pixels adjacent to the pixel of interest are added up in order to produce a value-difference sum for each of aforementioned classes and a weight assigned to the expression of the constraint condition equation established for the particular pixels is computed in accordance with a computation equation based on the value-difference sum; and a prediction coefficient is found as a coefficient to be used in image processing carried out by an image processing apparatus to predict the value of a pixel of interest included in an output image as an output-image pixel corresponding to the pixel of interest in the teacher image from the values of pixels included in an input image as input-image pixels corresponding to the specific pixels in the student image for the deterioration type corresponding to the deterioration model equation and for the class by carrying out a computation process. In addition, the image processing apparatus to which the present invention is applied can have any configuration of as long as the image processing apparatus carries out image processing making use of the prediction coefficient learned in coefficient learning processing carried out by the coefficient learning apparatus provided by the present invention.

As is obvious from the description given so far, the present invention has characteristics described as follows.

As an example, the present invention can be applied to blurring removal processing in which the values of pixels in an image without blurring are found by solving condition equations based on mixture models and condition equations representing constraints.

In addition, as another example, the present invention can be used for statistically learning constraint conditions from an image without blurring.

On top of that, as a further example, the present invention is characterized in that the present invention can be applied to compute a prediction coefficient to be used for finding a teacher image from a student image by: sequentially setting each of pixels in the teacher image is as a pixel of interest and generating a class for the pixel of interest from the values of a plurality of specific pixels included in the student image as student pixels located at positions corresponding to the position of the pixel of interest in the teacher image and peripheral positions surrounding the position of the pixel of interest; adding up feature quantities composing a constraint condition equation representing relations between the values of at least some particular pixels included in the teacher image and pixels adjacent to the particular pixels as well as used as the pixel of interest and pixels adjacent to the pixel of interest in the deterioration model equations used for finding the values of the specific pixels from the values of the pixel of interest and the pixels adjacent to the pixel of interest in order to produce a feature-quantity distribution for each of aforementioned classes and computing a weight assigned to the expression of the constraint condition equation established for the particular pixels in accordance with a computation equation based on the feature-quantity distribution; finding a prediction coefficient as a coefficient to be used in image processing carried out by an image processing apparatus to predict the value of a pixel of interest included in an output image as an output-image pixel corresponding to the pixel of interest in the teacher image from the values of pixels included in an input image as input-image pixels corresponding to the specific pixels in the student image for the deterioration type corresponding to the deterioration model equation and for the class by carrying out a computation process; and learning a relation between the student image and the teacher image.

In addition, as a further example, it is possible that the present invention can be applied to a coefficient learning process based on a normal equation.

On top of that, as a still further example, while serving as a model database, the present invention exhibits an effect of an ability to consider an error distribution learned by adoption of a statistical technique as an error distribution of a teacher image.

In addition, in the technology in related art disclosed in Patent Document 1 cited earlier in the paragraph with a title of "BACKGROUND OF THE INVENTION," weights to be assigned to constraint condition equations are determined on the basis of differences in value among adjacent pixels of an input image in accordance with Eqs. 159 and 160 described in Patent Document 1. Thus, the weights are not found by carrying out a learning process. In the case of the present invention, on the other hand, it is also possible to find weights to be assigned to constraint condition equations for each class on the basis of differences in value among adjacent pixels of an input image by carrying out a learning process. Thus, the present invention is capable of eliminating deteriorations even from an input image undesirably losing the original characteristics of the pre-deterioration image. The reader is suggested to keep in mind that, in the case of the technology in related art, it is possible that the capability of eliminating deteriorations from an input image having severe deteriorations unavoidably deteriorates.

In the embodiment described above, the blurring and reduction deteriorations are treated as separate deterioration models. It is to be noted, however, that a coefficient learning apparatus and an image learning apparatus forming an information processing system in conjunction with the coefficient learning apparatus are allowed to treat both the blurring and reduction deteriorations as a single deterioration model. That is to say, the present invention can be applied to an information processing system having a processing coefficient w for removal of blurring and a processing coefficient w for the purpose of zooming at the same time.

Incidentally, each series of processes described previously can be carried out by hardware and/or execution of software.

If each series of processes described above is carried out by execution of software, programs composing the software can be installed into a personal computer shown in FIG. 15 as a personal computer functioning as the coefficient learning apparatus and/or the image learning apparatus.

In the personal computer having the configuration shown in FIG. 15, the CPU (Central Processing Unit) 101 carries out each series of processes described previously by execution of programs stored in advance in the ROM (Read Only Memory) 102 or programs loaded from a storage section 108 into the RAM (Random Access Memory) 103. The RAM 103 is also used for properly storing various kinds of information such as data required in execution of the processing.

As described above, the CPU 101, the ROM 102 and the RAM 103 are connected to each other by the bus 104. In addition, the bus 104 is also connected to an input/output interface 105.

The input/output interface 105 is connected to an input section 106, an output section 107, the storage section 108 cited above, a communication section 109 and a drive 110. The input section 106 typically includes a keyboard and a mouse. The output section 107 typically includes a display unit whereas the storage section 108 includes a hard disk. The communication section 109 typically includes a modem and/or a terminal adapter. The communication section 109 is a section configured to control communications with other apparatus not shown in FIG. 15 through a network including the Internet.

As described above, the input/output interface 105 is connected to the drive 110. The drive 110 is a section on which a removable recording medium 111 is mounted. The removable recording medium 111 is a package medium which can be a magnetic disk, an optical disk, a magneto-optical disk, or a semiconductor memory.

If the series of processes described above is carried out by execution of software, programs composing the software can be installed into a computer embedded in dedicated hardware, a general-purpose personal computer or the like. A general-purpose personal computer is a personal computer, which can be made capable of carrying out a variety of functions by installing a variety of programs into the personal computer. In the following description, the computer and the personal computer are referred to simply as the computer.

The aforementioned recording medium for recording programs is the removable recording medium 111 provided to the user separately from the main unit of the computer as shown in FIG. 15. Examples of the removable recording mediums also each referred to as a package medium include the magnetic disk such as a floppy disk, the optical disk such as a CD-ROM (Compact Disk-Read Only Memory) or a DVD (Digital Versatile Disk), the magneto-optical disk such as an MD (Mini Disk) as well as the semiconductor memory. Instead of installing the programs from the removable recording mediums 111, the programs can also be stored in advance in an embedded recording medium included in the main unit of the computer. Examples of the embedded recording medium are a hard disk included in the storage section 108 and the ROM 102.

It is also worth noting that, in this specification, steps of each flowchart described above as a flowchart representing a program stored in the removable recording mediums can be carried out not only in an order prescribed in advance along the time axis, but also concurrently or individually.

It is also to be noted that the technical term 'system' used in this specification implies the configuration of a confluence including a plurality of apparatus. In other words, the information processing system shown in FIGS. 3 and 9 can be implemented typically by the personal computer shown in FIG. 15.

In addition, it should be understood by those skilled in the art that various modifications, combinations, sub-combinations and alterations may occur depending on design requirements and other factors insofar as they are within the scope of the appended claims or the equivalents thereof.

What is claimed is:

1. A coefficient learning apparatus comprising:
    student-image generation means for generating a student image, which has a quality degraded from the quality of a teacher image in accordance with a plurality of deterioration model equations each corresponding to one of a plurality of deterioration types, from said teacher image;
    class classification means for sequentially setting each of pixels in said teacher image as a pixel of interest and generating a class for each pixel of interest from values of pixels in said student image located at positions corresponding to the position of each pixel of interest and peripheral positions surrounding said position of each pixel of interest;
    weight computation means for computing a weight of each constraint condition equation of a plurality of constraint condition equations for at least some pixels in said teacher image based on the sum of feature quantities for said each class, said feature quantity representing a relation between said at least some pixels and adjacent pixels in said teacher image under each deterioration model equation used for finding the values of pixels in said student image from values of pixels located at positions corresponding to the position of each pixel of interest and peripheral positions surrounding said position of each pixel of interest; and
    processing-coefficient generation means for generating a prediction coefficient to predict a value of each pixel of interest in said teacher image by carrying out a computation process applying to a plurality of pixels in the student image for each deterioration type and each class on the basis of a determinant including each deterioration model equation and each constraint condition equation.

2. The coefficient learning apparatus according to claim 1, wherein said weight computation means assigns a weight value of said constraint condition equation that is inversely proportional to a sum of feature quantities.

3. The coefficient learning apparatus according to claim 1, wherein said student-image generation means generates a student image by adding blurring appearances to said teacher image.

4. The coefficient learning apparatus according to claim 1, wherein said student-image generation means generates a student image by reducing said teacher image.

5. A coefficient learning method adopted by a coefficient learning apparatus, said coefficient learning method comprising:
    generating a student image, which has a quality degraded from the quality of a teacher image in accordance with a plurality of deterioration model equations each corresponding to one of a plurality of deterioration types, from said teacher image;
    sequentially setting each of pixels in said teacher image as a pixel of interest and generating a class for each pixel of interest from values of pixels in said student image located at positions corresponding to the position of each pixel of interest and peripheral positions surrounding said position of each pixel of interest;
    computing a weight of each constraint condition equation of a plurality of constraint condition equations for at least some pixels in said teacher image based on the sum of feature quantities for said each class, said feature quantity representing a relation between said at least some pixels and adjacent pixels in said teacher image under each deterioration model equation used for finding the values of pixels in said student image from values of pixels located at positions corresponding to the position of each pixel of interest and peripheral positions surrounding said position of each pixel of interest; and generating a prediction coefficient to predict the value of each pixel of interest in said teacher image by carrying out a computation process applying to a plurality of pixels in the student image for each deterioration type and each class on the basis of a determinant including each deterioration model equation and each constraint condition equation.

6. A non-transitory computer readable medium encoded with a coefficient learning program to be executed by a computer to carry out a coefficient learning process comprising:

generating a student image, which has a quality degraded from the quality of a teacher image in accordance with a plurality of deterioration model equations each corresponding to one of a plurality of deterioration types, from said teacher image;

sequentially setting each of pixels in said teacher image as a pixel of interest and generating a class for each pixel of interest from values of pixels in said student image located at positions corresponding to the position of each pixel of interest and peripheral positions surrounding said position of each pixel of interest;

computing a weight of each constraint condition equation for at least some pixels in said teacher image based on the sum of feature quantities for said each class, said feature quantity representing a relation between said at least some pixels and adjacent pixels in said teacher image under each deterioration model equation used for finding the values of pixels in said student image from values of pixels located at positions corresponding to the position of each pixel of interest and peripheral positions surrounding said position of each pixel of interest; and generating a prediction coefficient to predict the value of each pixel of interest in said teacher image by carrying out a computation process applying to a plurality of pixels in the student image for said each deterioration type and each class on the basis of a determinant including said each deterioration model equation and each constraint condition equation.

7. A coefficient learning apparatus comprising:

a student-image generation section configured to generate a student image, which has a quality degraded from the quality of a teacher image in accordance with a plurality of deterioration model equations each corresponding to one of a plurality of deterioration types, from said teacher image;

a class classification section configured to sequentially set each of pixels in said teacher image as a pixel of interest and generate a class for each pixel of interest from values of pixels in said student image located at positions corresponding to the position of each pixel of interest and peripheral positions surrounding said position of each pixel of interest;

a weight computation section configured to compute a weight of each constraint condition equation of a plurality of constraint condition equations for at least some pixels in said teacher image based on the sum of feature quantities for said each class, said feature quantity representing a relation between said at least some pixels and adjacent pixels in said teacher image under each deterioration model equation used for finding the values of pixels in said student image from values of pixels located at positions corresponding to the position of each pixel of interest and peripheral positions surrounding said position of each pixel of interest; and a processing-coefficient generation section configured to generate a prediction coefficient to predict the value of each pixel of interest in said teacher image by carrying out a computation process applying to a plurality of pixels in the student image for each deterioration type and each class on the basis of a determinant including each deterioration model equation and each constraint condition equation.

\* \* \* \* \*